United States Patent
Siminoff

(10) Patent No.: US 12,061,687 B1
(45) Date of Patent: Aug. 13, 2024

(54) MIGRATING AUDIO/VIDEO RECORDING AND COMMUNICATION DEVICES TO NEW NETWORKS

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 561 days.

(21) Appl. No.: 16/040,533

(22) Filed: Jul. 19, 2018

Related U.S. Application Data

(60) Provisional application No. 62/536,136, filed on Jul. 24, 2017.

(51) Int. Cl.
| | |
|---|---|
| *G06F 21/45* | (2013.01) |
| *H04N 7/18* | (2006.01) |
| *H04W 12/04* | (2021.01) |
| *H04L 9/40* | (2022.01) |

(52) U.S. Cl.
CPC ............ *G06F 21/45* (2013.01); *H04N 7/186* (2013.01); *H04W 12/04* (2013.01); *H04L 63/0876* (2013.01)

(58) Field of Classification Search
CPC .... G06F 21/45; H04W 12/04; H04L 63/0876; H04N 7/186
See application file for complete search history.

(56) References Cited

U.S. PATENT DOCUMENTS

| | | |
|---|---|---|
| 4,764,953 A | 8/1988 | Chern et al. |
| 5,428,388 A | 6/1995 | von Bauer et al. |
| 5,760,848 A | 6/1998 | Cho |
| 6,072,402 A | 6/2000 | Kniffin et al. |
| 6,192,257 B1 | 2/2001 | Ray |

(Continued)

FOREIGN PATENT DOCUMENTS

| | | |
|---|---|---|
| CN | 2585521 Y | 11/2003 |
| CN | 2792061 Y | 6/2006 |

(Continued)

*Primary Examiner* — Saleh Najjar
*Assistant Examiner* — Devin E Almeida
(74) *Attorney, Agent, or Firm* — Lee & Hayes, P.C.

(57) ABSTRACT

Migrating audio/video (A/V) recording and communication devices to new networks in accordance with various embodiments of the present disclosure are provided. In one embodiment, a method for an A/V recording and communication device comprises: storing first network access credentials for accessing a first network having first network credentials; connecting to a second network using the first network access credentials, the second network being broadcast by a client device and having second network credentials identical to the first network credentials; in response to connecting to the second network, communicating over the second network, with the client device; in response to communicating with the client device, receiving updated network access credentials for accessing a third network having third network credentials different than the first and the second network credentials; and in response to receiving the updated network access credentials, connecting to the third network using the updated network access credentials.

25 Claims, 23 Drawing Sheets

(56) References Cited

U.S. PATENT DOCUMENTS

| | | |
|---|---|---|
| 6,271,752 B1 | 8/2001 | Vaios |
| 6,429,893 B1 | 8/2002 | Kin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,937,659 B1 | 1/2015 | Scalisi et al. |
| 8,941,736 B1 | 1/2015 | Scalisi |
| 8,942,974 B1 * | 1/2015 | Leblang ............... G06F 40/263 704/270.1 |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,469,599 B2 * | 11/2019 | Yoden ................ H04L 12/2814 |
| 10,574,654 B1 * | 2/2020 | Schroeder ............ H04L 63/10 |
| 10,993,110 B2 * | 4/2021 | Annaiah ............... H04L 67/12 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2006/0209773 A1 * | 9/2006 | Hundal ................ H04L 63/06 370/338 |
| 2007/0008081 A1 | 1/2007 | Tylicki et al. |
| 2010/0128103 A1 * | 5/2010 | Sim ........................ H04N 7/148 348/14.02 |
| 2010/0225455 A1 | 9/2010 | Claiborne et al. |
| 2011/0294502 A1 * | 12/2011 | Oerton .................... H04W 4/60 455/426.1 |
| 2013/0057695 A1 | 3/2013 | Huisking |
| 2013/0086665 A1 * | 4/2013 | Filippi ................. H04W 12/062 726/7 |
| 2014/0055611 A1 * | 2/2014 | Wong ..................... F16M 11/10 348/143 |
| 2014/0267716 A1 | 9/2014 | Child et al. |
| 2015/0163463 A1 | 6/2015 | Hwang et al. |
| 2016/0037436 A1 * | 2/2016 | Spencer ................ H04W 12/08 370/338 |
| 2016/0037564 A1 * | 2/2016 | Borden .................. H04W 48/16 370/254 |
| 2016/0198402 A1 * | 7/2016 | Ko ........................ H04W 12/08 370/329 |
| 2017/0339728 A1 * | 11/2017 | Lee ....................... H04W 12/041 |
| 2018/0084403 A1 * | 3/2018 | Kode .................... H04W 8/183 |
| 2018/0144147 A1 * | 5/2018 | Nix ....................... H04L 9/0869 |
| 2018/0167812 A1 * | 6/2018 | Nagarajamoorthy ........................ H04L 9/0861 |
| 2018/0176009 A1 * | 6/2018 | Agerstam ............. H04W 12/04 |
| 2018/0234787 A1 * | 8/2018 | Karimli ................. H04W 4/70 |
| 2019/0089934 A1 * | 3/2019 | Goulden .......... G08B 13/19684 |
| 2019/0116184 A1 * | 4/2019 | Neser ............. H04W 12/00504 |
| 2019/0335324 A1 * | 10/2019 | Ringland ............. H04L 63/083 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

MIGRATING AUDIO/VIDEO RECORDING AND COMMUNICATION DEVICES TO NEW NETWORKS

CROSS-REFERENCE TO RELATED APPLICATION

This application claims priority to provisional application Ser. No. 62/536,136, filed on Jul. 24, 2017, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of one or more an A/V recording and communication devices on the exterior of a home, such as a doorbell unit at the entrance of a home, acts as a powerful deterrent against would-be burglars.

SUMMARY

The various embodiments of the present migrating audio/video (A/V) devices to new networks have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that users/owners of A/V recording and communication devices may move to a new residence or new business property, may change internet service providers (ISP), and/or may install a new router, each of which may require establishing a new network (e.g., a new wireless network) having new network credentials. As a result, current network access credentials of the A/V recording and communication devices of the user/owner may need to be reconfigured for the new network. However, reconfiguration of A/V recording and communication devices, other than the present embodiments, may not be as efficient as desired. For example, if the user/owner operates multiple A/V recording and communication devices, the user/owner may have to reconfigure each of the devices individually, which may be time consuming. As another example, if the user/owner switches to a new ISP and/or installs a new router at his or her current residence or business, the A/V recording and communication devices installed at the current residence or business may be difficult to access for reconfiguration (e.g., may be mounted out of reach), and as a result, reconfiguring the A/V recording and communication devices may be more difficult than desired.

The present embodiments solve this problem by leveraging the functionality of A/V recording and communication devices, such as A/V recording and communication doorbells, to allow the A/V recording and communication devices to be reconfigured (e.g., have their current network access credentials updated) through a connection to a local network generated by a client device of the user/owner of the A/V recording and communication devices. For example, the client device may mimic the network that the A/V recording and communication devices are currently programmed to access (e.g., based on the current network access credentials), and establish communication with the A/V recording and communication devices over the mimicked network. Once communication is established, the client device may update the current network access credentials of the A/V recording and communication devices to updated network access credentials to enable the A/V recording and communication devices to connect to the new network. As a result of this process, users/owners of A/V recording and communication devices may be more likely to reconfigure their devices at an earlier time due to the increased efficiency of reconfiguration. By reconfiguring their A/V recording and communication devices at an earlier time, the residence or business of the users/owners may be more safe and secure at an earlier time, thereby increasing the overall safety of the residence or business, and contributing to public safety as a whole.

In a first aspect, a method for a client device including a processor and a communication module is provided, the method comprising: generating, by the processor, a first network having first network credentials identical to second network credentials of a second network in communication with an audio/video (A/V) recording and communication device; in response to generating the first network, receiving, by the processor using the communication module, an access request from the A/V recording and communication device, the access request including a request to connect to the first network using the second network credentials identical to the first network credentials; in response to receiving the access request, connecting, by the processor using the communication module, to the A/V recording and communication device; in response to connecting to the A/V recording and communication device, updating, by the processor using the communication module, network access credentials of the A/V recording and communication device to create updated network access credentials to enable the A/V recording and communication device to connect to a third network, the updated network access credentials including third network credentials different than both the first and the second network credentials; and in response to the updating, disconnecting, by the processor, from the A/V recording and communication device.

In an embodiment of the first aspect, the first network credentials include at least one of a service set identifier (SSID), a wireless key, and a media access control (MAC) address.

In another embodiment of the first aspect, the MAC address is a MAC address of an access point of the second network.

In another embodiment of the first aspect, the access point is a router and the second network is a wireless network.

In another embodiment of the first aspect, the access request is received in response to the A/V recording and communication device attempting to connect to the second network.

In another embodiment of the first aspect, the access request is received in response to the A/V recording and communication device being disconnected from the second network.

In another embodiment of the first aspect, the first network is an ad hoc network and the connection to the A/V recording and communication device is a direct connection.

In another embodiment of the first aspect, the third network credentials include at least one of a service set identifier (SSID), a wireless key, and a media access control (MAC) address.

In another embodiment of the first aspect, wherein the updated network access credentials include at least one of the SSID, the wireless key, and the MAC address from the third network credentials.

In another embodiment of the first aspect, prior to updating the network access credentials of the A/V recording and communication device, receiving, by the processor, the third network credentials.

In a second aspect, a client device is provided, the client device comprising: a communication module; one or more processors; and a non-transitory machine-readable memory storing a program, the program executable by at least one of the processors, the program comprising sets of instructions for: generating a first network having first network credentials identical to second network credentials of a second network in communication with an audio/video (A/V) recording and communication device; in response to generating the first network, receiving, using the communication module, an access request from the A/V recording and communication device, the access request including a request to connect to the first network using the second network credentials identical to the first network credentials; in response to receiving the access request, connecting, using the communication module, to the A/V recording and communication device; in response to connecting to the A/V recording and communication device, updating, using the communication module, network access credentials of the A/V recording and communication device to create updated network access credentials to enable the A/V recording and communication device to connect to a third network, the updated network access credentials including third network credentials different than both the first and the second network credentials; and in response to the updating, disconnecting from the A/V recording and communication device.

In an embodiment of the second aspect, the first network credentials include at least one of a service set identifier (SSID), a wireless key, and a media access control (MAC) address.

In another embodiment of the second aspect, the MAC address is a MAC address of an access point of the second network.

In another embodiment of the second aspect, the access point is a router and the second network is a wireless network.

In another embodiment of the second aspect, the access request is received in response to the A/V recording and communication device attempting to connect to the second network.

In another embodiment of the second aspect, the access request is received in response to the A/V recording and communication device being disconnected from the second network.

In another embodiment of the second aspect, the first network is an ad hoc network and the connection to the A/V recording and communication device is a direct connection.

In another embodiment of the second aspect, the third network credentials include at least one of a service set identifier (SSID), a wireless key, and a media access control (MAC) address.

In another embodiment of the second aspect, the updated network access credentials include at least one of the SSID, the wireless key, and the MAC address from the third network credentials.

In another embodiment of the second aspect, prior to updating the network access credentials of the A/V recording and communication device, receiving the third network credentials.

In a third aspect, a method for a client device including a processor and a communication module is provided, the method comprising: storing, by the processor, first network credentials for connecting to a first wireless network; connecting, by the processor using the communication module, to the first wireless network using the first network credentials; transmitting, by the processor using the communication module, over the first wireless network, a deauthentication signal to a wireless access point broadcasting the first wireless network, the deauthentication signal programmed to deauthenticate an audio/video (A/V) recording and communication device from the wireless access point; in response to transmitting the deauthentication signal, generating, by the processor, an ad hoc network having second network credentials identical to the first network credentials; in response to generating the ad hoc network, receiving, by the processor using the communication module, an access request from the A/V recording and communication device, the access request including a request to connect to the ad hoc network using the first network credentials identical to the second network credentials; in response to receiving the access request, connecting, by the processor using the communication module, to the A/V recording and communication device; in response to connecting to the A/V recording and communication device, updating, by the processor using the communication module, network access credentials of the A/V recording and communication device to create updated network access credentials to enable the A/V recording and communication device to connect to a third network, the updated network access credentials including third network credentials different than both the first and the second network credentials; and in response to the updating, disconnecting, by the processor, from the A/V recording and communication device.

In an embodiment of the third aspect, the first network credentials include at least one of a service set identifier (SSID), a wireless key, and a media access control (MAC) address.

In another embodiment of the third aspect, the MAC address is a MAC address of the wireless access point broadcasting the first network.

In another embodiment of the third aspect, the wireless access point is a router.

In another embodiment of the third aspect, the access request is received in response to the A/V recording and communication device attempting to re-connect to the first wireless network after being deauthenticated.

In another embodiment of the third aspect, the third network credentials include at least one of a service set identifier (SSID), a wireless key, and a media access control (MAC) address.

In another embodiment of the third aspect, the updated network access credentials include at least one of the SSID, the wireless key, and the MAC address from the third network credentials.

In another embodiment of the third aspect, prior to updating the network access credentials of the A/V recording and communication device, receiving, by the processor, the third network credentials.

In another embodiment of the third aspect, the ad hoc network is a wireless ad hoc network (WANET), a mobile ad hoc network (MANET), or a smart phone ad hoc network (SPAN).

In a fourth aspect, a method for an audio/video (A/V) recording and communication device including a processor and a communication module, the method comprising: storing, by the processor, first network access credentials for accessing a first network having first network credentials; connecting, by the processor using the communication module, to a second network using the first network access credentials, the second network being broadcast by a client device and having second network credentials identical to the first network credentials; in response to connecting to the second network, communicating, by the processor using the communication module, over the second network, with the client device; in response to communicating with the client device, receiving, by the processor using the communication module, from the client device, updated network access credentials for accessing a third network having third network credentials different than the first and the second network credentials; and in response to receiving the updated network access credentials, connecting, by the processor using the communication module, to the third network using the updated network access credentials.

In an embodiment of the fourth aspect, wherein the first network credentials include at least one of a service set identifier (SSID), a wireless key, and a media access control (MAC) address.

In another embodiment of the fourth aspect, the MAC address is a MAC address of an access point of the first network.

In another embodiment of the fourth aspect, the access point is a router and the first network is a wireless network.

In another embodiment of the fourth aspect, the A/V recording and communication device connects to the second network in response to being disconnected from the first network.

In another embodiment of the fourth aspect, the A/V recording and communication device is disconnected from the first network in response to a deauthentication request.

In another embodiment of the fourth aspect, the second network is an ad hoc network and the connection to the client device is a direct connection.

In another embodiment of the fourth aspect, the first network is wireless network, the second network is an ad hoc network, and the third network is a wireless network.

In another embodiment of the fourth aspect, the first network is a local network of a first residence and the third network is a local network of a second residence different than the first residence.

In another embodiment of the fourth aspect, the third network credentials include at least one of a service set identifier (SSID), a wireless key, and a media access control (MAC) address.

In another embodiment of the fourth aspect, the updated network access credentials include at least one of the SSID, the wireless key, and the MAC address from the third network credentials.

In a fifth aspect, an audio/video (A/V) recording and communication device comprising: a communication module; one or more processors; and a non-transitory machine-readable memory storing a program, the program executable by at least one of the processors, the program comprising sets of instructions for: storing first network access credentials for accessing a first network having first network credentials; connecting, using the communication module, to the first network using the first network access credentials; disconnecting, using the communication module, from the first network; connecting, using the communication module, to a second network using the first network access credentials, the second network being broadcast by a client device and having second network credentials identical to the first network credentials; in response to connecting to the second network, communicating, using the communication module, over the second network, with the client device; in response to communicating with the client device, receiving, using the communication module, from the client device, updated network access credentials for accessing a third network having third network credentials different than the first and the second network credentials; and in response to receiving the updated network access credentials, connecting, using the communication module, to the third network using the updated network access credentials.

In an embodiment of the fifth aspect, the first network credentials include at least one of a service set identifier (SSID), a wireless key, and a media access control (MAC) address.

In another embodiment of the fifth aspect, the MAC address is a MAC address of an access point of the first network.

In another embodiment of the fifth aspect, the access point is a router and the first network is a wireless network.

In another embodiment of the fifth aspect, the A/V recording and communication device connects to the second network in response to being disconnected from the first network.

In another embodiment of the fifth aspect, the A/V recording and communication device is disconnected from the first network in response to a deauthentication request.

In another embodiment of the fifth aspect, the second network is an ad hoc network and the connection to the client device is a direct connection.

In another embodiment of the fifth aspect, the first network is wireless network, the second network is an ad hoc network, and the third network is a wireless network.

In another embodiment of the fifth aspect, the first network is a local network of a first residence and the third network is a local network of a second residence different than the first residence.

In another embodiment of the fifth aspect, the third network credentials include at least one of a service set identifier (SSID), a wireless key, and a media access control (MAC) address.

In another embodiment of the fifth aspect, the updated network access credentials include at least one of the SSID, the wireless key, and the MAC address from the third network credentials.

In a sixth aspect, a method for an audio/video (A/V) recording and communication device including a processor and a communication module is provided, the method comprising: storing, by the processor, first network access credentials for accessing a first network having first network credentials; connecting, by the processor using the communication module, to the first network using the first network access credentials; in response to being disconnected from the first network, connecting, by the processor using the communication module, to a second network using the first network access credentials, the second network being broadcast by a client device and having second network credentials identical to the first network credentials; in response to connecting to the second network, communicating, by the processor using the communication module, over the second network, with the client device; in response to communicating with the client device, receiving, by the processor using the communication module, from the client device, updated network access credentials for accessing a third network having third network credentials different than the first and the second network credentials; and in response to receiving the updated network access credentials, connecting, by the processor using the communication module, to the third network using the updated network access credentials.

In an embodiment of the sixth aspect, the first network credentials include at least one of a service set identifier (SSID), a wireless key, and a media access control (MAC) address.

In another embodiment of the sixth aspect, the MAC address is a MAC address of an access point of the first network.

In another embodiment of the sixth aspect, the access point is a router and the first network is a wireless network.

In another embodiment of the sixth aspect, the A/V recording and communication device is disconnected from the first network in response to a deauthentication request.

In another embodiment of the sixth aspect, the second network is an ad hoc network and the connection to the client device is a direct connection.

In another embodiment of the sixth aspect, the first network is wireless network, the second network is an ad hoc network, and the third network is a wireless network.

In another embodiment of the sixth aspect, the first network is a local network of a first residence and the third network is a local network of a second residence different than the first residence.

In another embodiment of the sixth aspect, the third network credentials include at least one of a service set identifier (SSID), a wireless key, and a media access control (MAC) address.

In another embodiment of the sixth aspect, the updated network access credentials include at least one of the SSID, the wireless key, and the MAC address from the third network credentials.

BRIEF DESCRIPTION OF THE DRAWINGS

The various embodiments of the present migrating audio/video (A/V) devices to new networks now will be discussed in detail with an emphasis on highlighting the advantageous features. These embodiments depict the novel and non-obvious migrating audio/video (A/V) devices to new networks shown in the accompanying drawings, which are for illustrative purposes only. These drawings include the following figures, in which like numerals indicate like parts.

DETAILED DESCRIPTION

Figure 1:
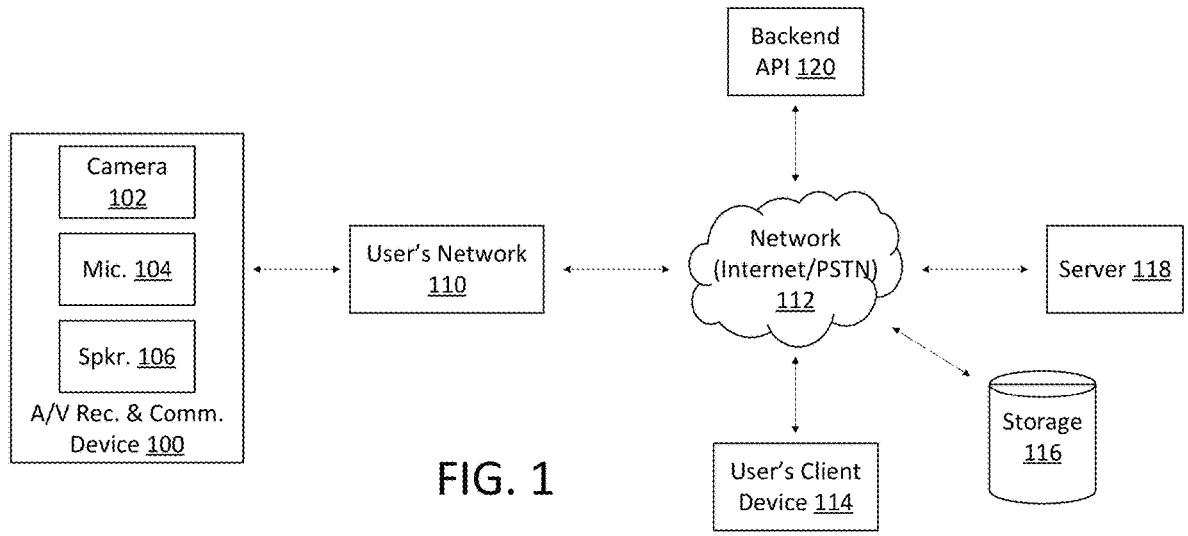
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present migrating audio/video (A/V) devices to new networks are described below with reference to the figures. These figures, and their written descriptions, indicate that certain components of the apparatus are formed integrally (e.g., a single unitary piece), and certain other components are formed as separate pieces. Components shown and described herein as being formed integrally may in alternative embodiments be formed as separate pieces. Further, components shown and described herein as being formed as separate pieces may in alternative embodiments be formed integrally.

With reference to FIG. 1, the present embodiments include an audio/video (A/V) recording and communication device 100. The A/V recording and communication device 100 may in some embodiments comprise a doorbell, and may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi© networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
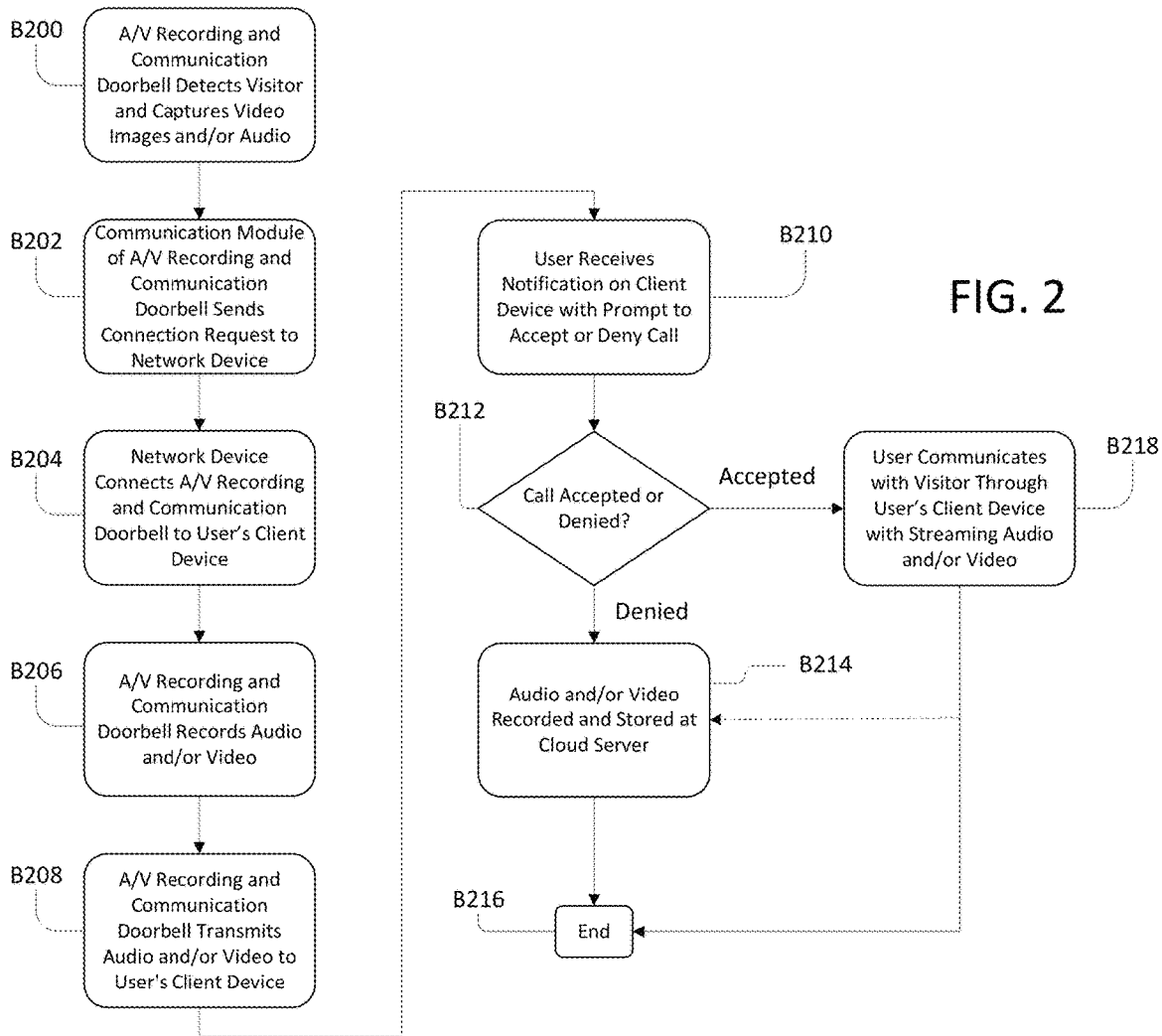
FIG. 2 is a flowchart illustrating one embodiment of a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact.

Figure 3:
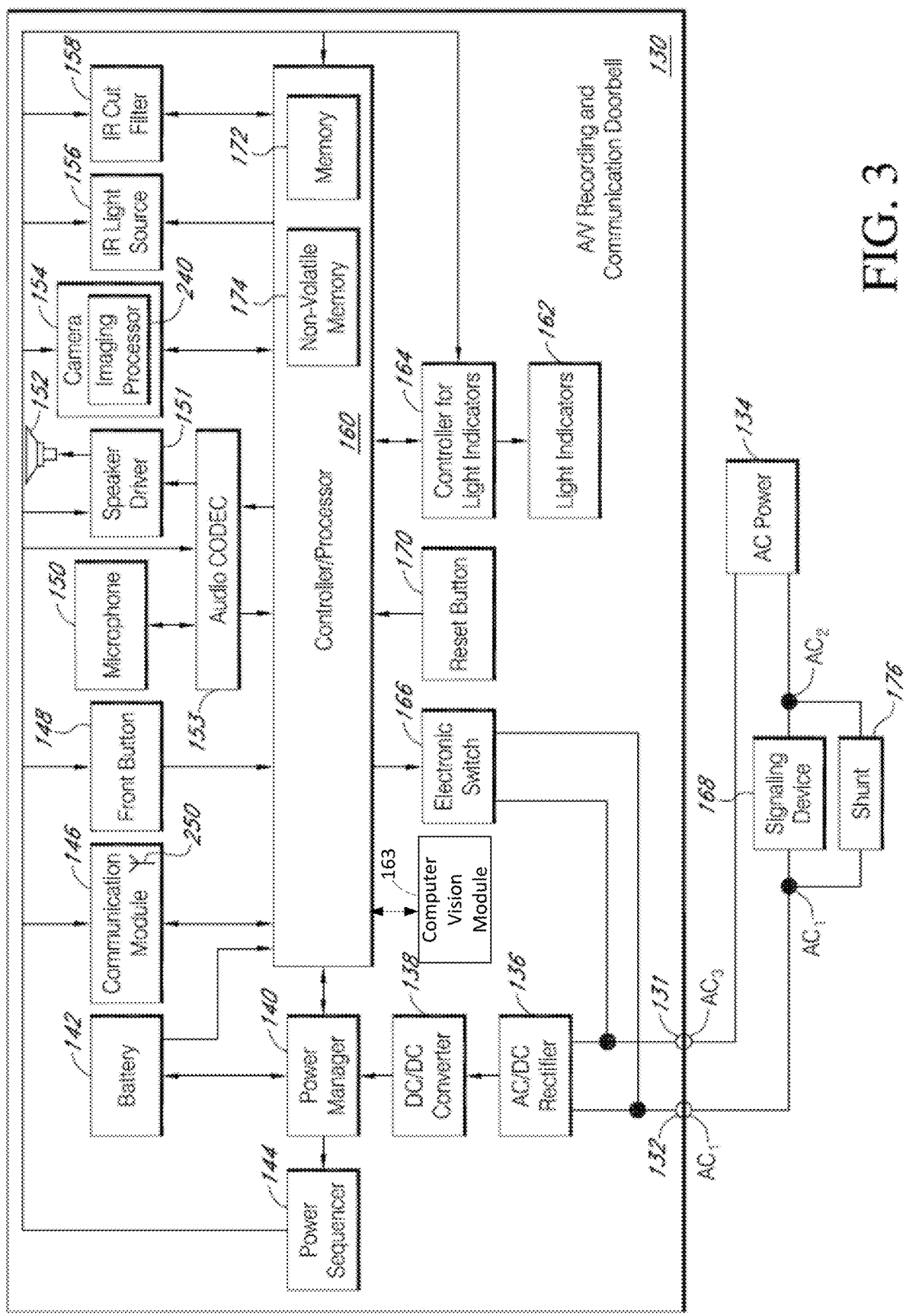
FIG. 3 is a functional block diagram illustrating an embodiment of an A/V recording and communication doorbell system according to the present disclosure.

FIGS. 3-13 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
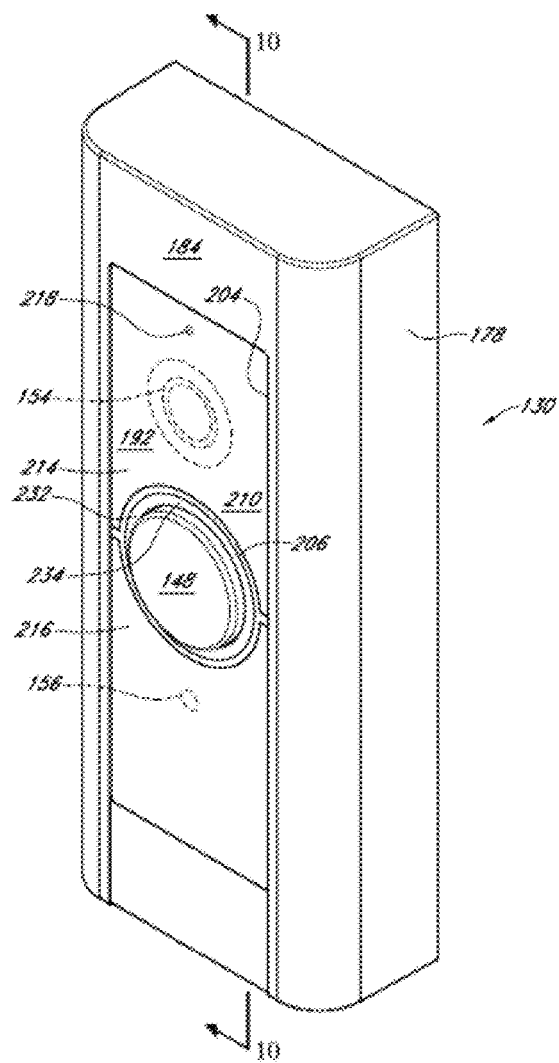
FIG. 4 is a front perspective view of an embodiment of an A/V recording and communication doorbell according to the present disclosure.
Figure 5:
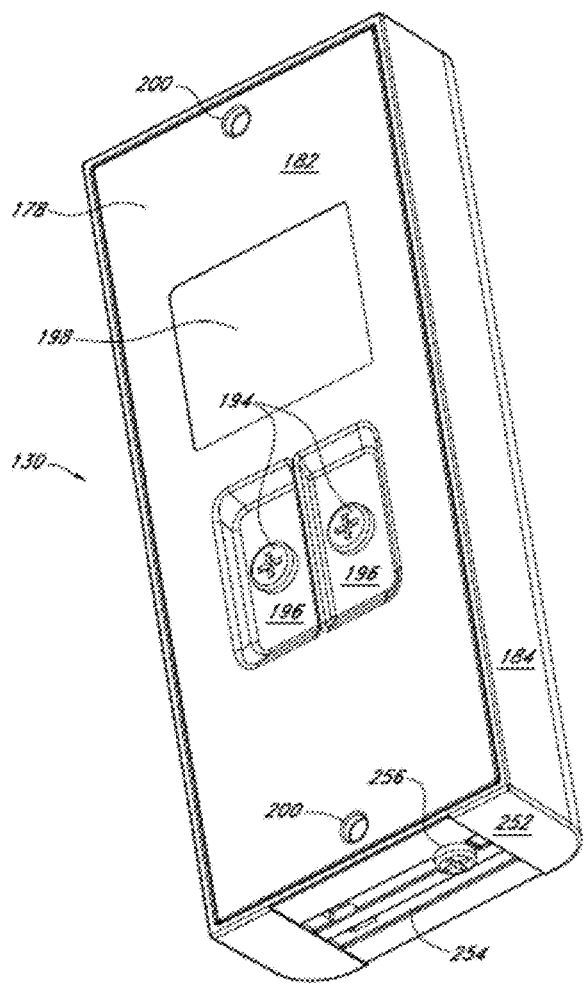
FIG. 5 is a rear perspective view of the A/V recording and communication doorbell of FIG. 4.
Figure 6:
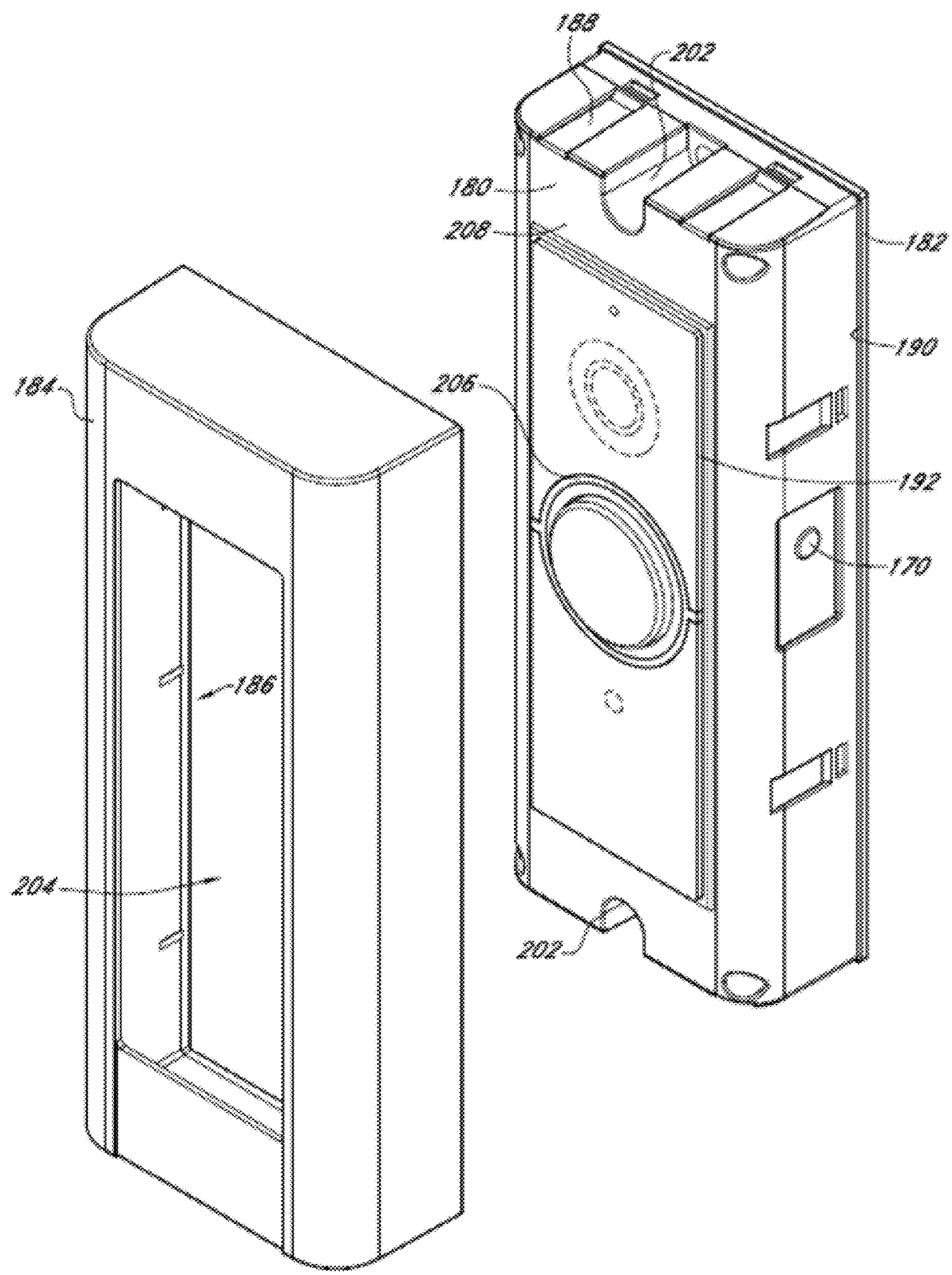
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close-fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
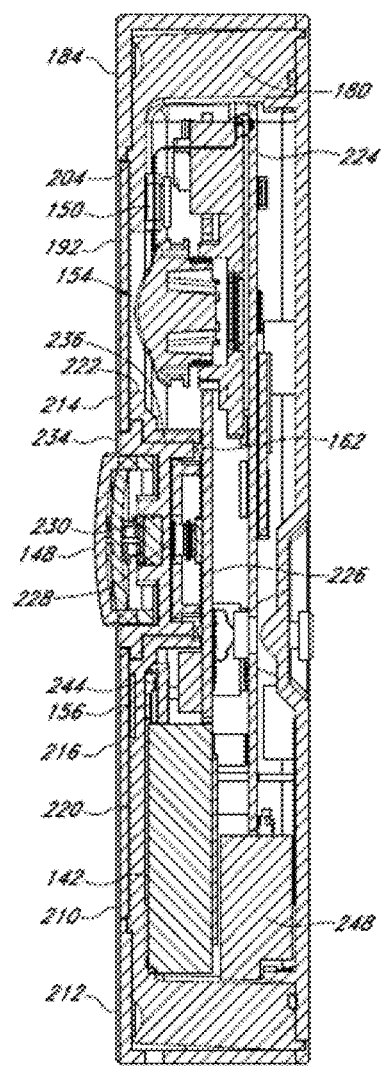
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
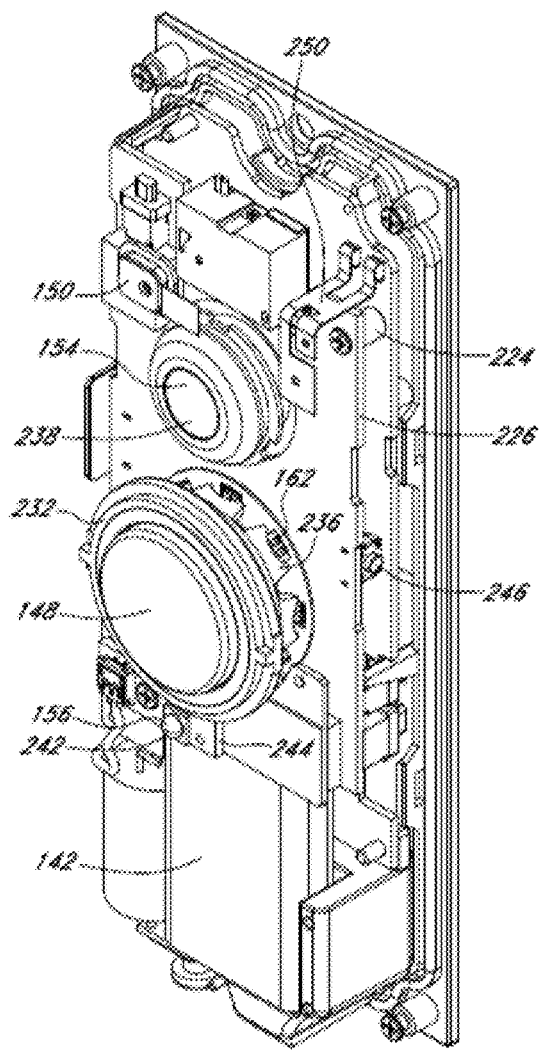
FIGS. 7-9 are front perspective views of various internal components of the A/V recording and communication doorbell of FIG. 4.
Figure 8:
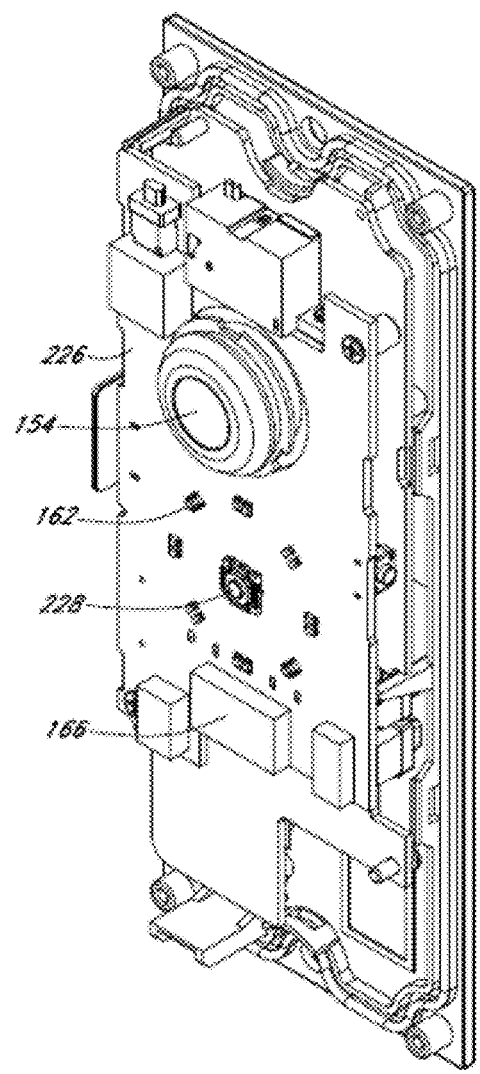
Figure 9:
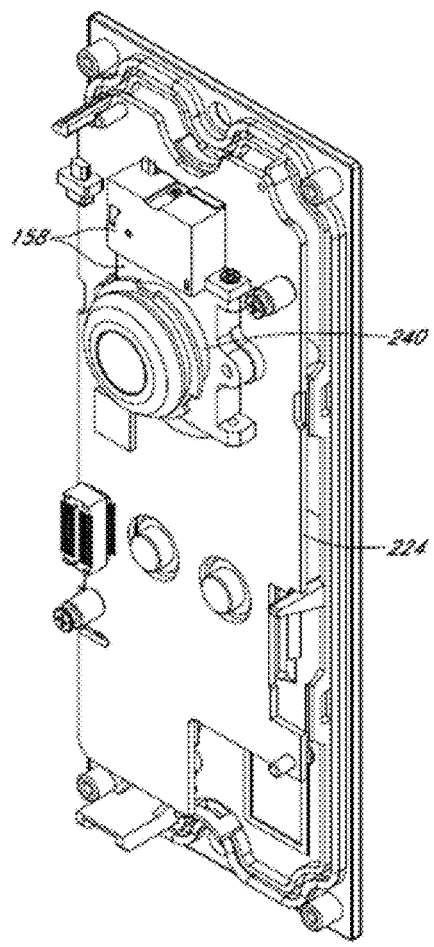

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor so to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
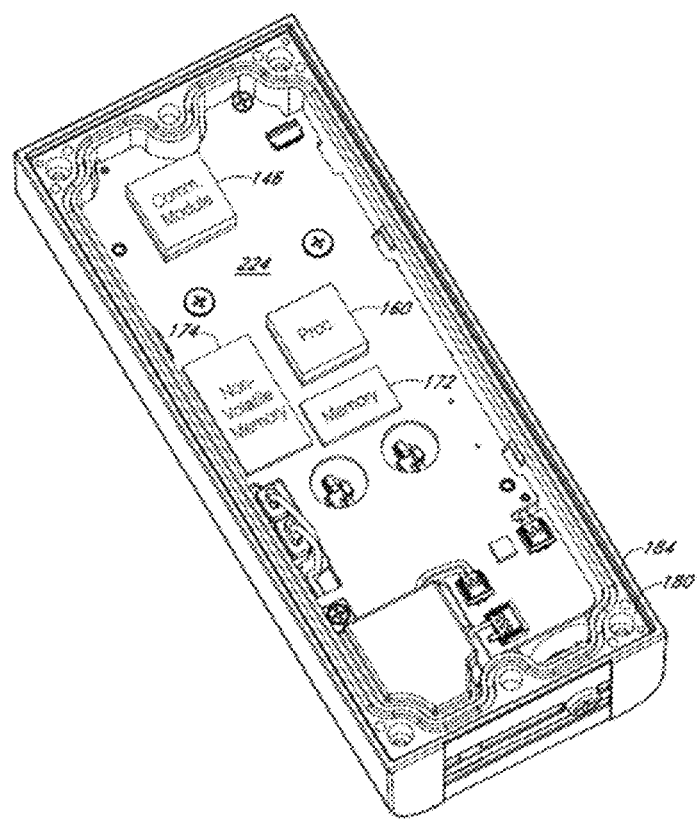
FIGS. 11-13 are rear perspective views of various internal components of the A/V recording and communication doorbell of FIG. 4.
Figure 12:
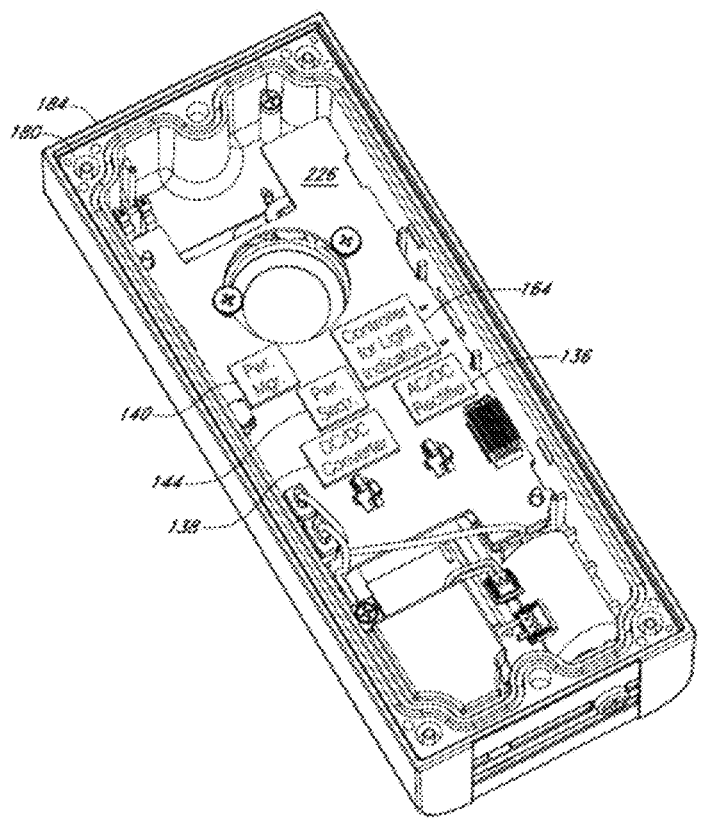
Figure 13:
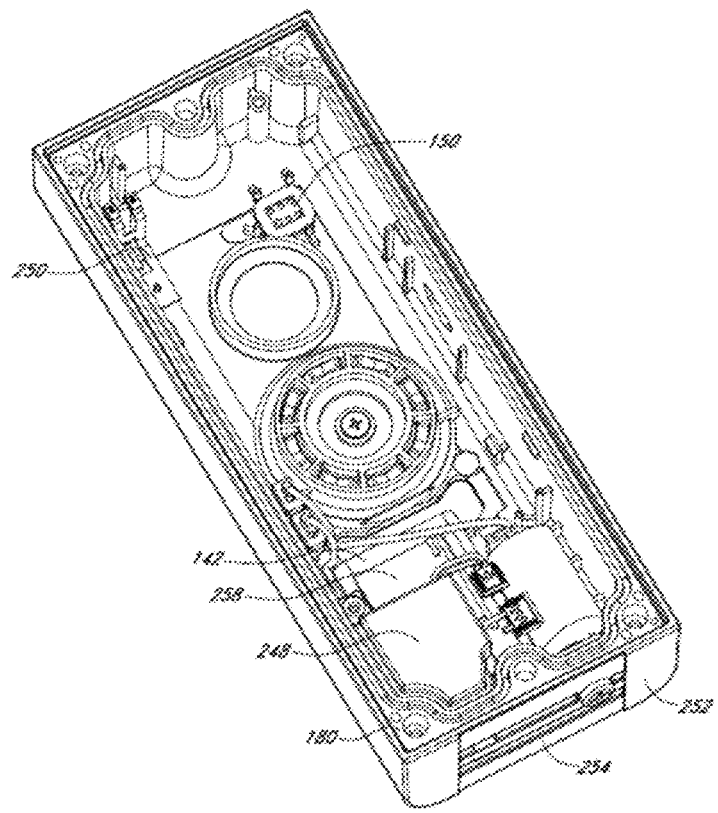

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 16:
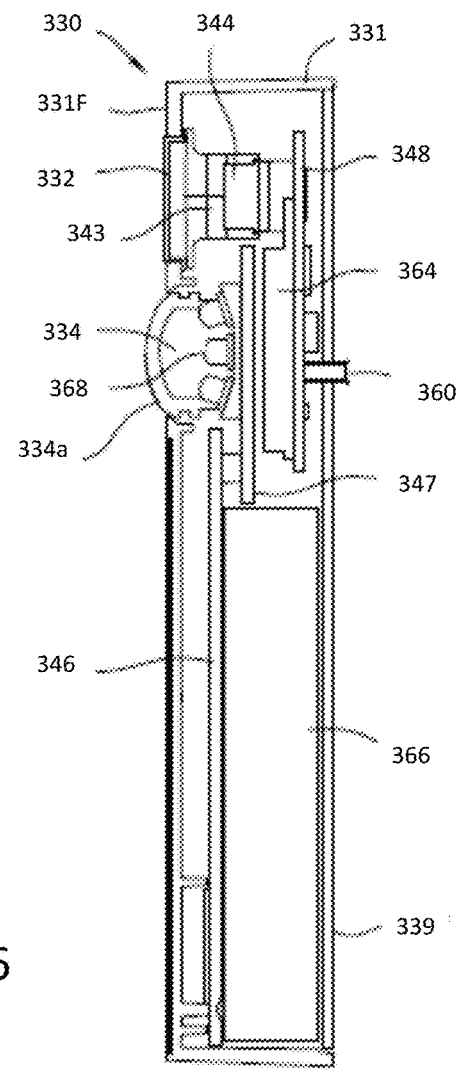
FIG. 16 is right-side cross-sectional view of the A/V recording and communication device of FIG. 14.
Figure 14:
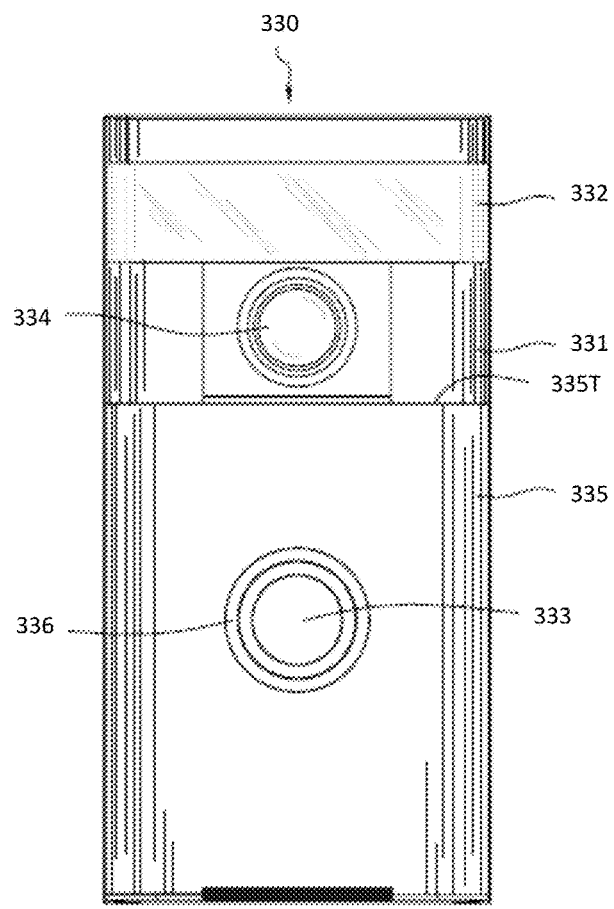
FIG. 14 is a front view of an A/V recording and communication device according to various aspects of the present disclosure.
Figure 15:
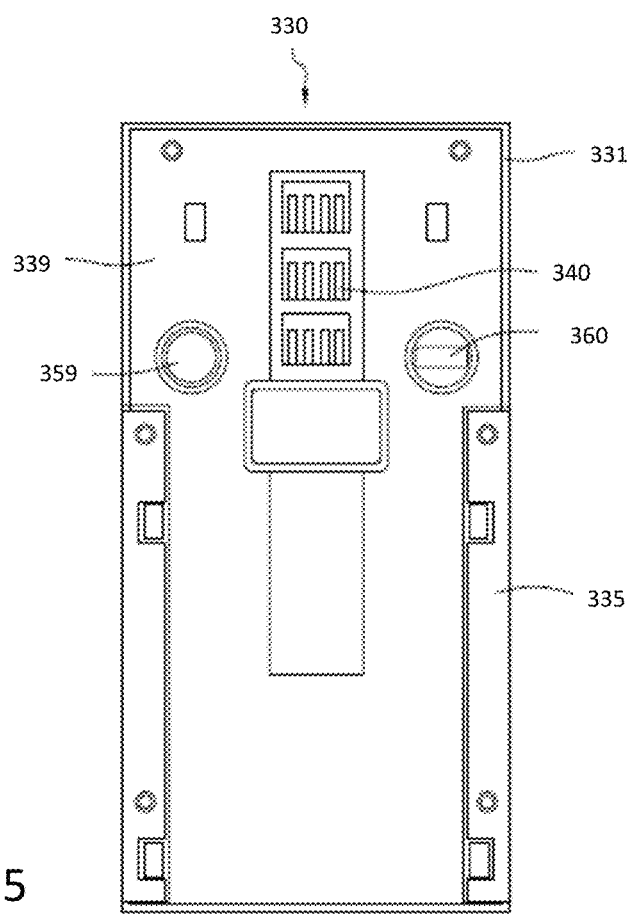
FIG. 15 is a rear view of the A/V recording and communication device of FIG. 14.
Figure 17:
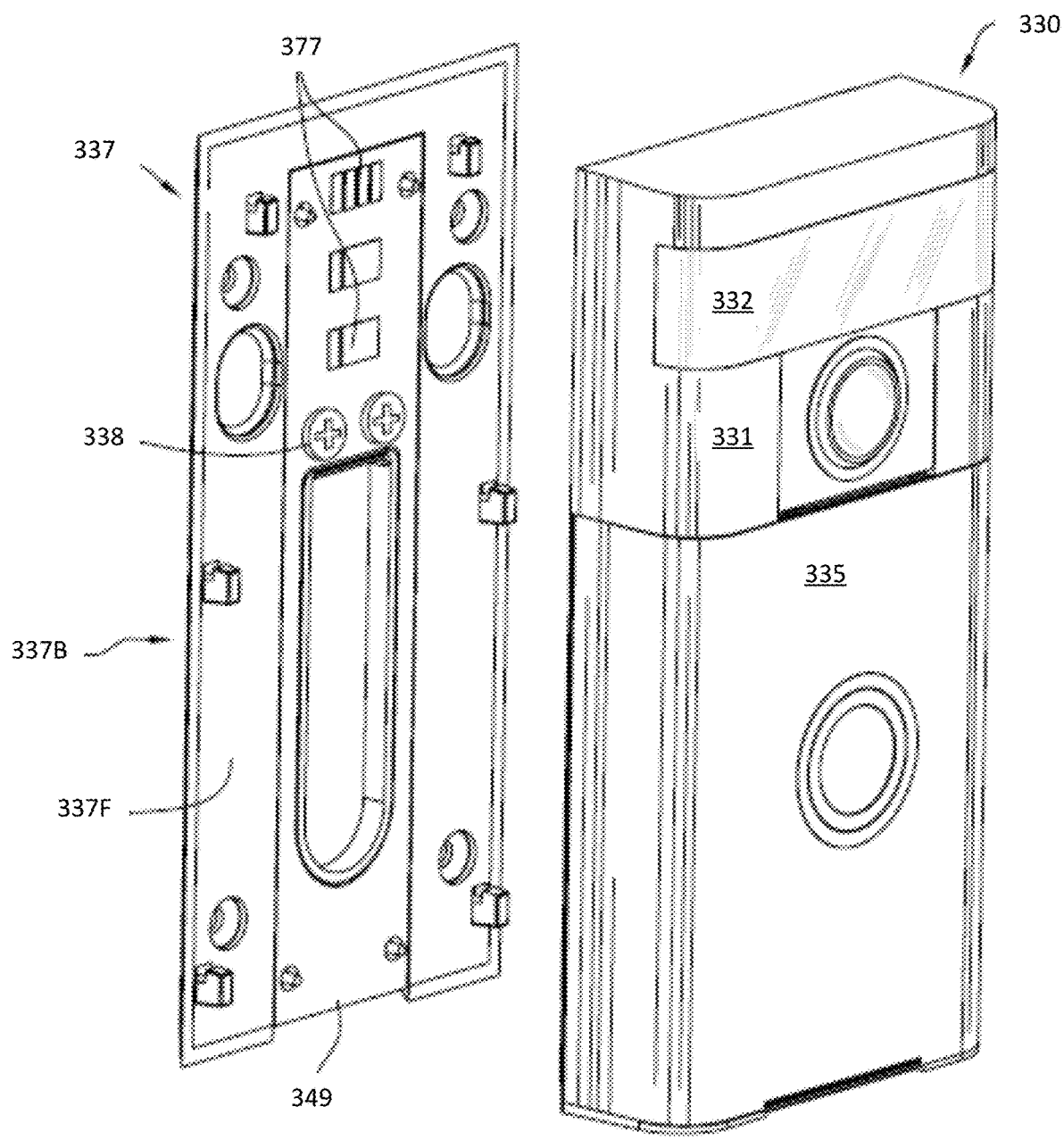
FIG. 17 is an exploded view of the A/V recording and communication device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some embodiments the material of the enclosure 331 preferably permits infrared light to pass through from inside the doorbell 330 to the environment and vice versa. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334a of the camera 334 protrudes through an opening in the enclosure 331. The camera lens 334a may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some embodiments, the doorbell 330 may comprise three PTR sensors 344, as further described below, but in other embodiments any number of PIR sensors 344 may be provided. In some embodiments, one or more of the PIR sensors 344 may comprise a pyroelectric infrared sensor. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
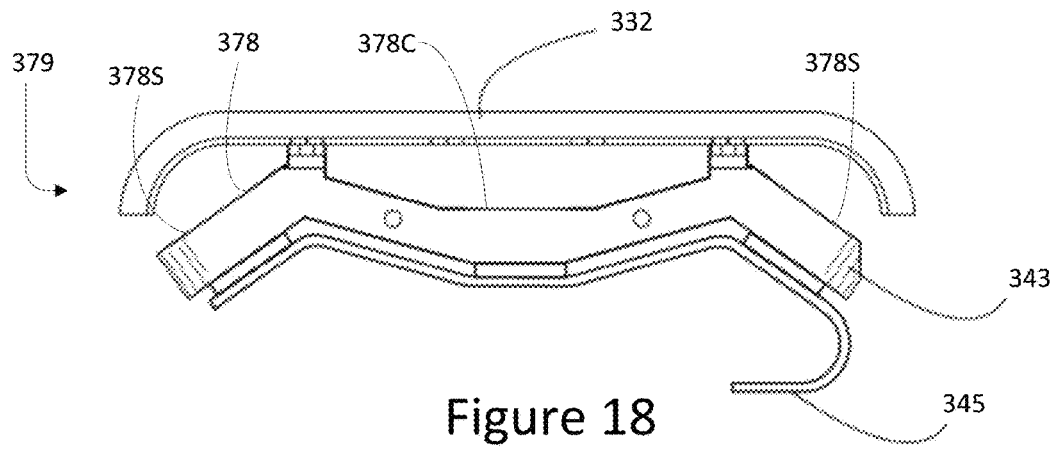
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
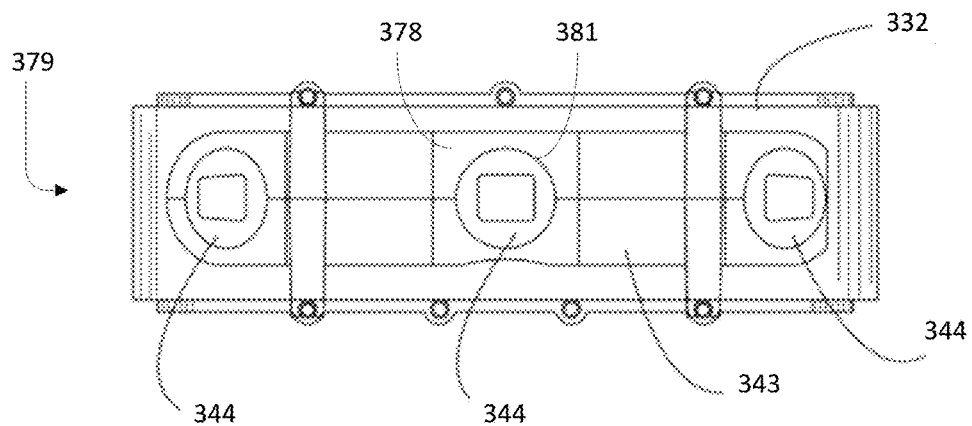
FIG. 19 is a front view of the passive infrared sensor assembly of FIG. 18.

FIG. 18 is a top view and FIG. 19 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 19, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 18, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 20:
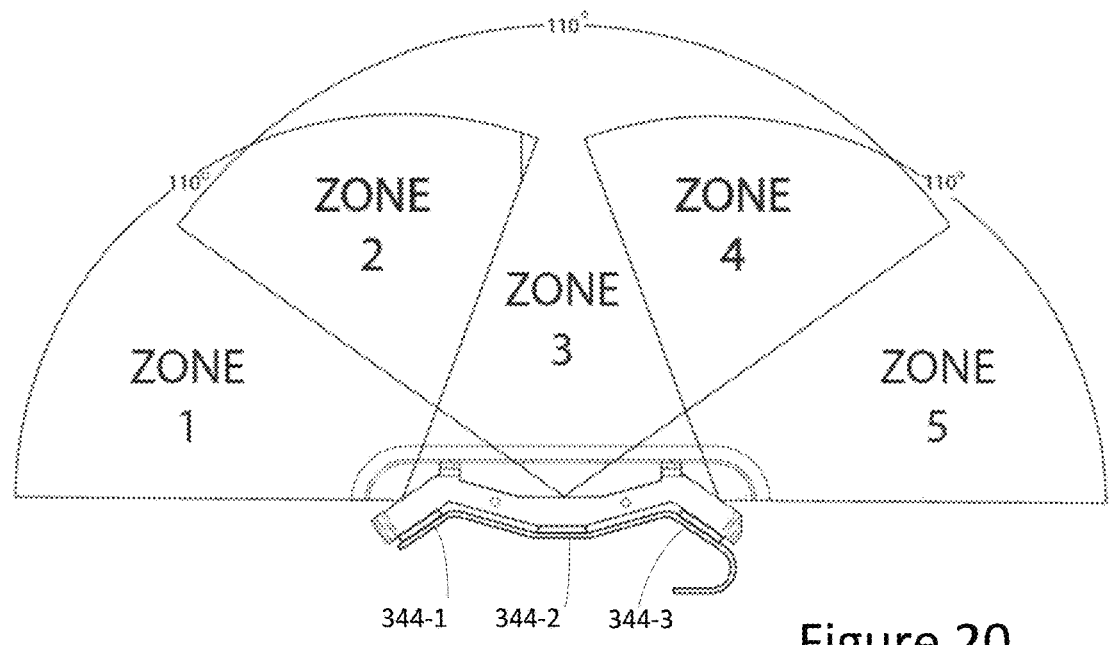
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 179 illustrating the fields of view of the passive infrared sensors 144. In the illustrated embodiment, the side faces 178S of the passive infrared sensor holder 143 are angled at 550 facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 21:
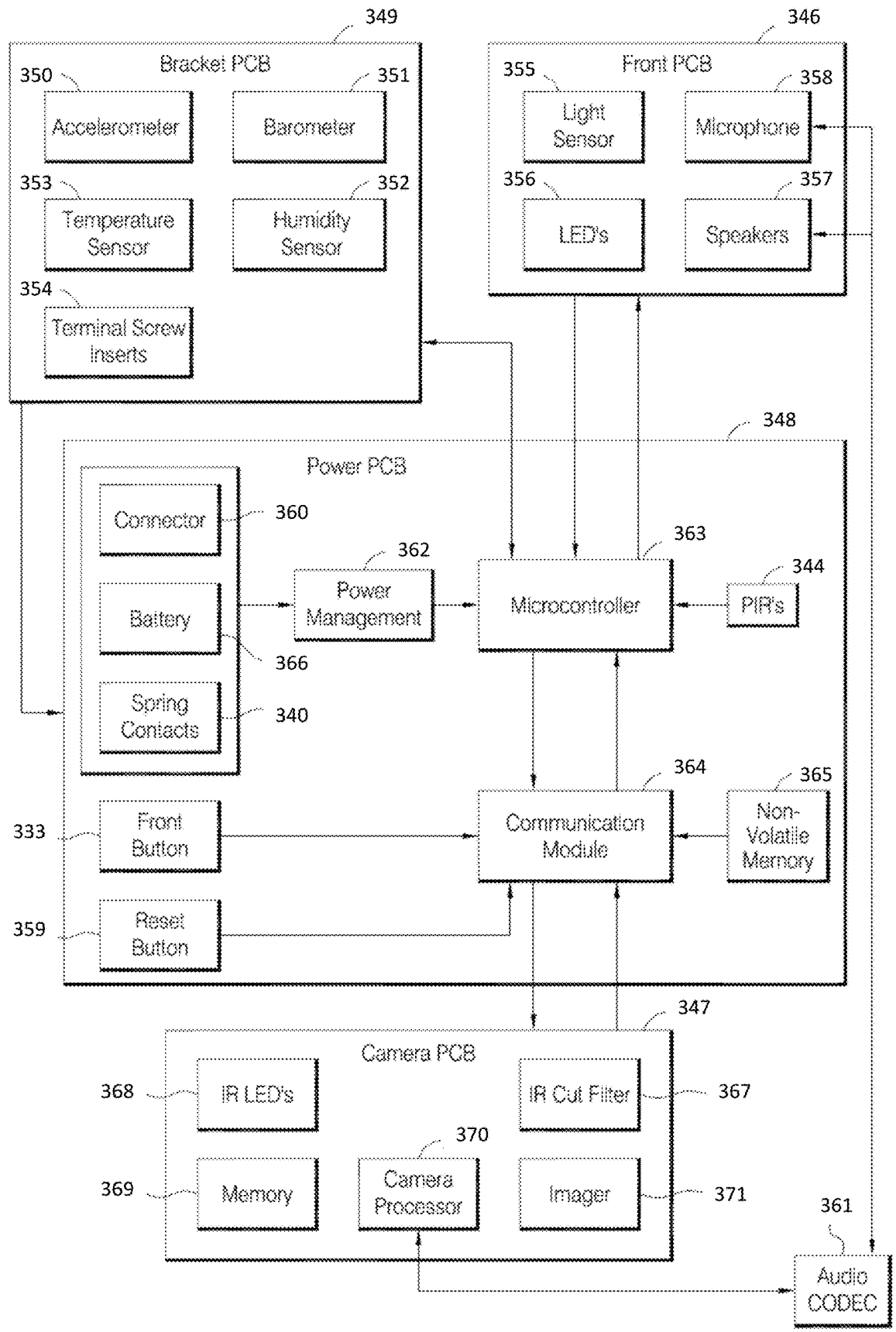
FIG. 21 is a functional block diagram of the components of the A/V recording and communication device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electro-mechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

As discussed above, one aspect of the present embodiments includes the realization that users/owners of A/V recording and communication devices may move to a new residence or new business property, may change internet service providers (ISP), and/or may install a new router, each of which may require establishing a new network (e.g., a new wireless network) having new network credentials. As a result, current network access credentials of the A/V recording and communication devices of the user/owner may need to be reconfigured for the new network. However, reconfiguration of A/V recording and communication devices, other than the present embodiments, may not be as efficient as desired. For example, if the user/owner operates multiple A/V recording and communication devices, the user/owner may have to reconfigure each of the devices individually, which may be time consuming. As another example, if the user/owner switches to a new ISP and/or installs a new router at his or her current residence or business, the A/V recording and communication devices installed at the current residence or business may be difficult to access for reconfiguration (e.g., may be mounted out of reach), and as a result, reconfiguring the A/V recording and communication devices may be more difficult than desired.

The present embodiments solve this problem by leveraging the functionality of A/V recording and communication devices, such as A/V recording and communication doorbells, to allow the A/V recording and communication devices to be reconfigured (e.g., have their current network access credentials updated) through a connection to a local network generated by a client device of the user/owner of the A/V recording and communication devices. For example, the client device may mimic the network that the A/V recording and communication devices are currently programmed to access (e.g., based on the current network access credentials), and establish communication with the A/V recording and communication devices over the mimicked network. Once communication is established, the client device may update the current network access credentials of the A/V recording and communication devices to updated network access credentials to enable the A/V recording and communication devices to connect to the new network. As a result of this process, users/owners of A/V recording and communication devices may be more likely to reconfigure their devices at an earlier time due to the increased efficiency of reconfiguration. By reconfiguring their A/V recording and communication devices at an earlier time, the residence or business of the users/owners may be more safe and secure at an earlier time, thereby increasing the overall safety of the residence or business, and contributing to public safety as a whole.

For example, in some of the present embodiments, a client device including a processor and a communication module, generates, by the processor, a first network having first network credentials identical to second network credentials of a second network in communication with an audio/video (A/V) recording and communication device; in response to generating the first network, receives, by the processor using the communication module, an access request from the A/V recording and communication device, the access request including a request to connect to the first network using the second network credentials identical to the first network credentials; in response to receiving the access request, connects, by the processor using the communication module, to the A/V recording and communication device; in response to connecting to the A/V recording and communication device, updates, by the processor using the communication module, network access credentials of the A/V recording and communication device to create updated network access credentials to enable the A/V recording and communication device to connect to a third network, the updated network access credentials including third network credentials different than both the first and the second network credentials; and in response to the updating, disconnects, by the processor, from the A/V recording and communication device.

Figure 22:
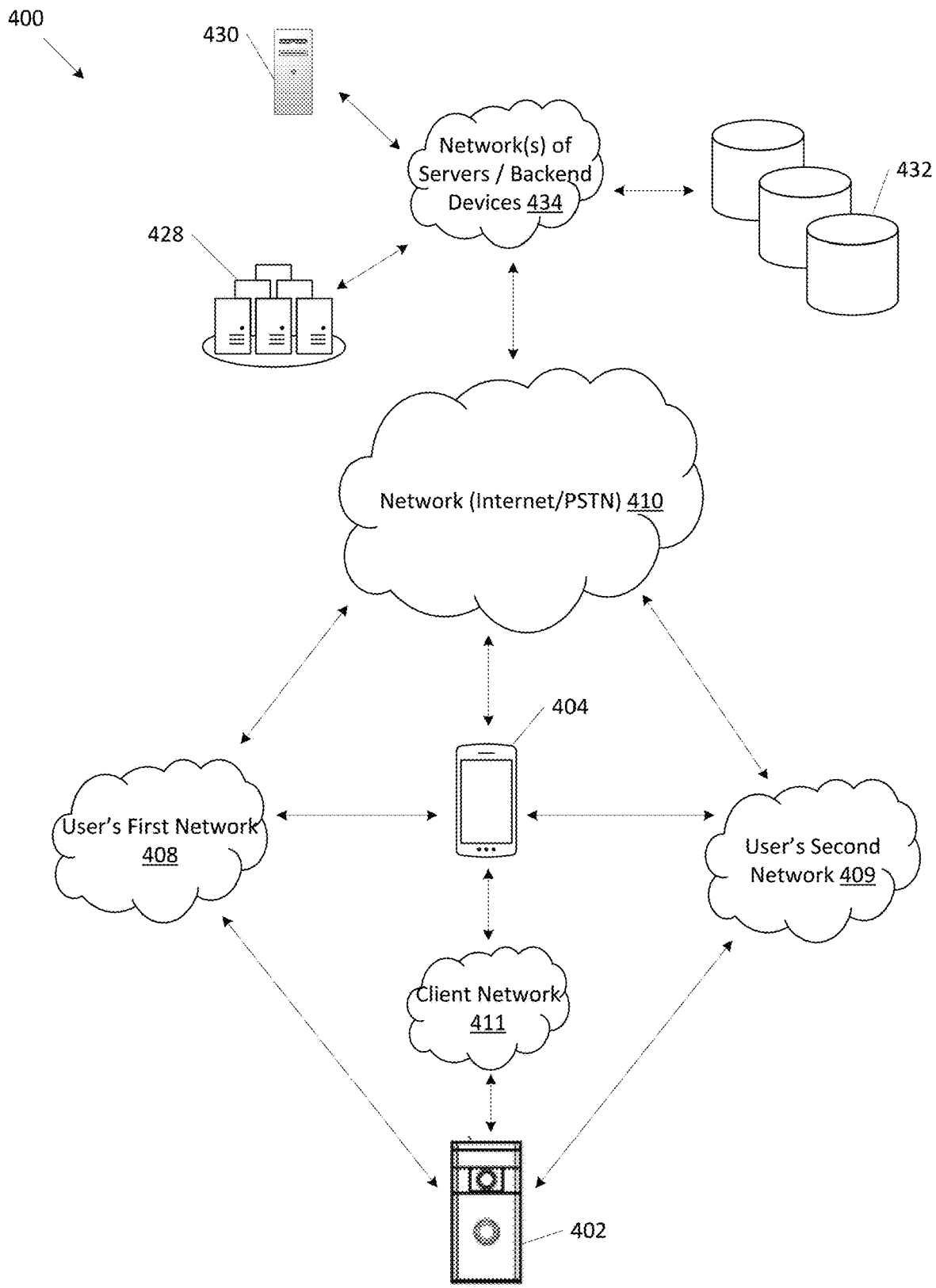
FIG. 22 is a functional block diagram illustrating one embodiment of a system for communicating in a network according to various aspects of the present disclosure.

Now referring to FIG. 22, FIG. 22 is a functional block diagram illustrating a system 400 for communicating in a network according to various aspects of the present disclosure. The system 400 may include one or more audio/video (A/V) recording and communication devices 402 configured to access a user's first network 408 to connect to a network (Internet/PSTN) 410. As described in more detail below, the A/V recording and communication device 402 may also be configured (e.g., reconfigured) to access a user's second network 409 to connect to the network (Internet/PSTN) 410. In addition, the A/V recording and communication device 402 may be configured to access a client network 411 broadcast by a client device 404. For example, as described below, based on the configuration of the A/V recording and communication device 402 for accessing the user's first network 408, the A/V recording and communication 402 may be configured to access the client network 411 (e.g., because the network credentials of the user's first network 408 and the client network 411 may be identical). The one or more A/V recording and communication devices 402 may include any or all of the components and/or functionality of the A/V recording and communication device 100 (FIGS. 1-2), the A/V recording and communication doorbell 130 (FIGS. 3-13), and/or the A/V recording and communication doorbell 330 (FIGS. 14-21). As discussed herein, the present disclosure provides numerous examples of methods and systems including A/V recording and communication devices 402, such as A/V recording and communication doorbells, but the present embodiments are equally applicable for A/V recording and communication devices 402 other than doorbells. For example, the present embodiments may include one or more A/V recording and communication security cameras and/or A/V recording and communication security floodlights instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

The user's first network 408 and the user's second network 409 may include any or all of the components and/or functionality of the user's network 110 described herein. The network (Internet/PSTN) 410 may include any or all of the components and/or functionality of the network (Internet/PSTN) 112 described herein. The system 400 may also include one or more client devices 404 which in various embodiments may be configured to be in network communication and/or associated with the A/V recording and communication device 402. In some of the present embodiments, the client devices 404 may be configured to be in network communication with one or more backend devices, such as the backend server(s) 430. The one or more client devices 404 may comprise, for example, a mobile phone such as a smartphone, or a computing device such as a tablet computer, a laptop computer, a desktop computer, etc. The client device 404 may include any or all of the components and/or functionality of the client device 114 and/or the client device 800 described herein. In some embodiments, the client device 404 may not be associated with the A/V recording and communication device 402. In other words, the user/owner of the client device(s) 404 may not also use/own the A/V recording and communication device 402.

As described above, the one or more client devices 404, in various embodiments, may be configured to be in communication with the one or more A/V recording and communication devices 402. The one or more client devices 404 may be in communication with the A/V recording and communication device 402 over the network (Internet/PSTN) 410, the user's first network 408, the user's second network 409, and/or the client network 411. In some of the present embodiments, the one or more client devices 404 may be connected to the user's first network 408 and communicate with the A/V recording and communication device 402 directly over the user's first network 408. In other embodiments (e.g., after updating the network access credentials 470 of the A/V recording and communication device 402 (FIG. 23)), the one or more client devices 404 may be connected to the user's second network 409 and communicate with the A/V recording and communication device 402 directly over the user's second network 409. In further embodiments, the client device 404 may be directly connected to the A/V recording and communication device 402 (e.g., where the A/V recording and communication device broadcasts a Wi-Fi direct network), and thus communicate directly with the A/V recording and communication device 402 without using the network (Internet/PSTN) 410, the user's first network 408, the user's second network 409, and/or the client network 411 (e.g., during a setup process). In some of the present embodiments, the client device 404 may be directly connected to the A/V recording and communication device 402 over the client network 411 and thus communicate directly with the A/V recording and communication device 402 without using the network (Internet/PSTN) 410, the user's first network 408, and/or the user's second network 409 (e.g., during updating of the network access credentials 470 (FIG. 23) of the A/V recording and communication device 402 according to processes described herein).

Figure 25:
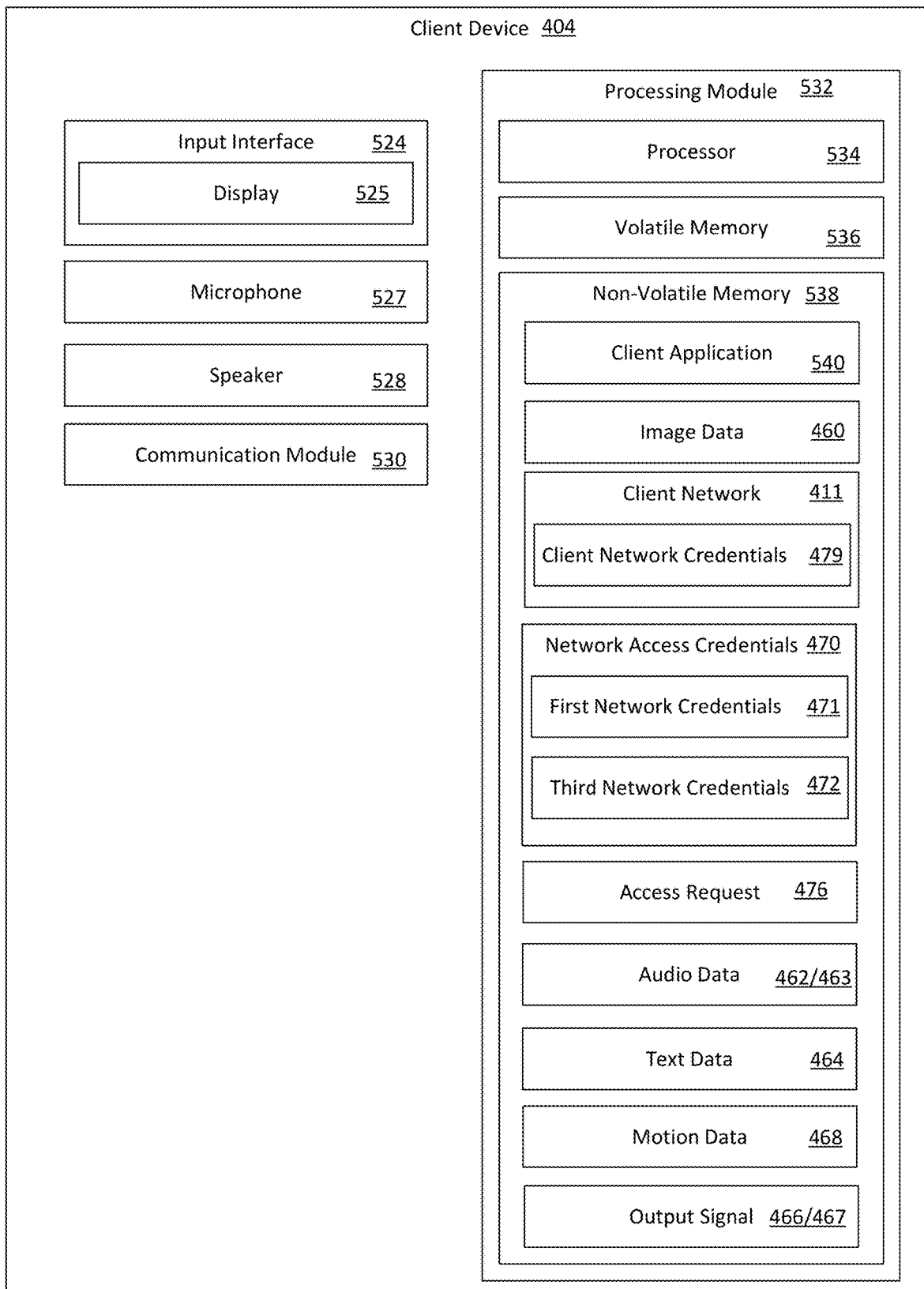
FIG. 25 is a functional block diagram illustrating one embodiment of a client device according to various aspects of the present disclosure.

With further reference to FIG. 22, the system 400 may include the client network 411. The client network 411 may be a network broadcast by the client device 404. For example, the client network 411 may be an ad hoc network, such as a wireless ad hoc network (WANET), a mobile ad hoc network (MANET), a smart phone ad hoc network (SPAN), or a Wi-Fi ad hoc network. In some of the present embodiments, the client network 411 may be a Wi-Fi direct network. The client network 411 may be broadcast by the client device 404 using the communication module 530 of the client device 404, for example. In some of the present embodiments, the processor 534 of the client device 404 may program the client application 540 to generate the client network 411 and control the communications between the A/V recording and communication device 402 and the client device 404 over the client network 411 (FIG. 25). In other words, the processor 534 may program the client application 540 to configure the client device 404 to act as an access point, such as a wireless router, for broadcasting the client network 411 and communicating with the one or more A/V recording and communication devices 402 (FIG. 25).

With further reference to FIG. 22, the system 400 may also include various backend devices such as (but not limited to) storage devices 432, backend servers 430, and backend APIs 428 that may be in network communication with the A/V recording and communication device 402 and/or the one or more client devices 404. In some embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

Figure 23:
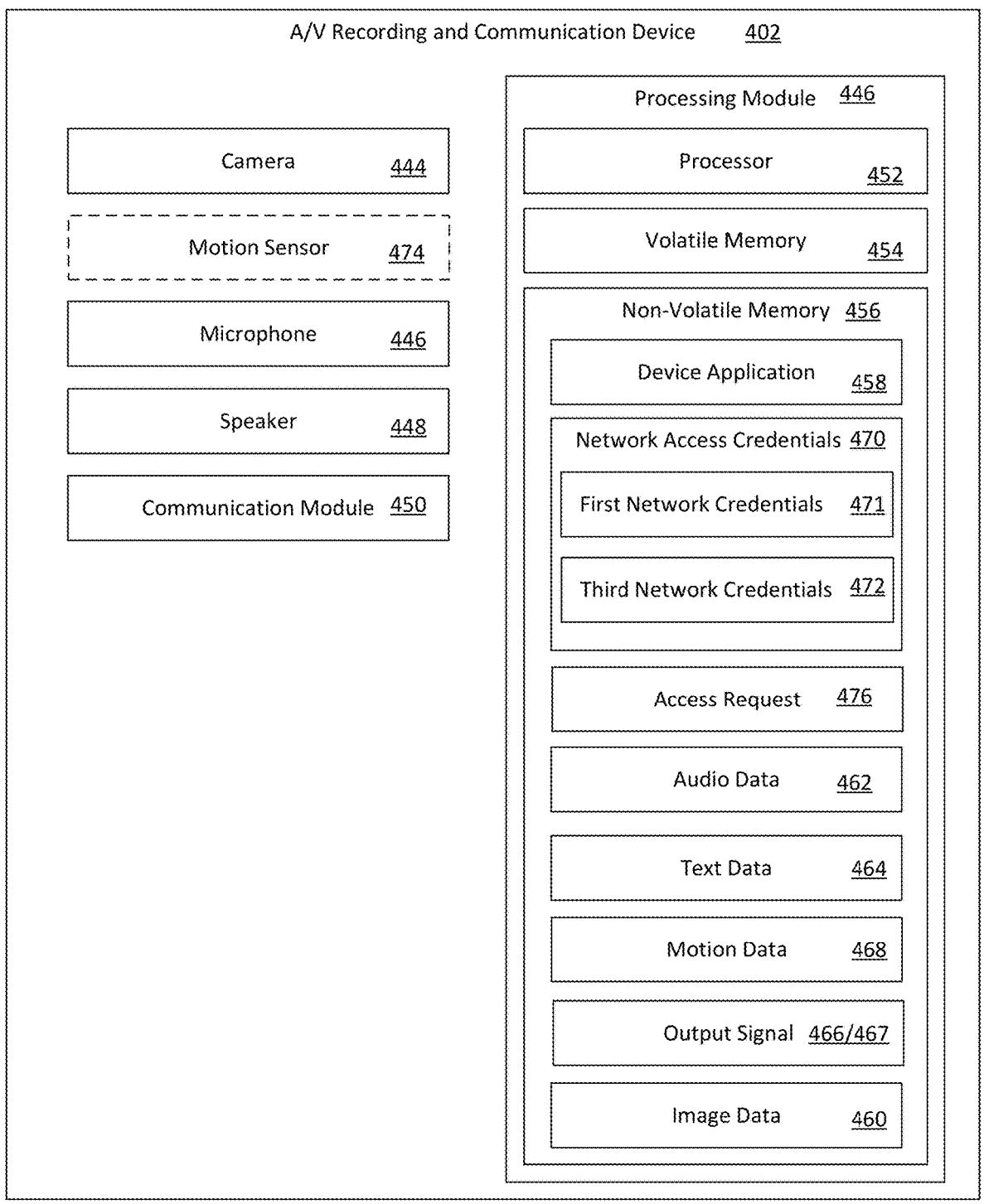
FIG. 23 is a functional block diagram illustrating one embodiment of an A/V recording and communication device according to various aspects of the present disclosure.

FIG. 23 is a functional block diagram illustrating an embodiment of the A/V recording and communication device 402 according to various aspects of the present disclosure. The A/V recording and communication device 402 may comprise a processing module 446 that is operatively connected to a camera 444, a microphone 446, a speaker 448, a motion sensor 474, and a communication module 450. The processing module 446 may comprise a processor 452, volatile memory 454, and non-volatile memory 456 that includes a device application 458. In various embodiments, the device application 458 may configure the processor 452 to capture image data 460 using the camera 444, audio data 462 using the microphone 446, and/or motion data 468 using the camera 444 and/or the motion sensor 474. In some embodiments, the device application 458 may also configure the processor 452 to generate text data 464 describing the image data 460, such as in the form of metadata, for example. In some of the present embodiments, the device application 458 may also configure the processor 452 to transmit an access request 476 using the communication module 450 for accessing the user's first network 408 (e.g., via a router), the user's second network 409, and as described herein, the client network 411 (e.g., via the client device 404). In addition, the device application 458 may configure the processor 452 to transmit the image data 460, the audio data 462, the motion data 468, the network access credentials 470 (e.g., in response to a configuration/setup/activation process), and/or the text data 464 to the client device 404 and/or the backend server 430 using the communication module 450.

In various embodiments, the device application 458 may also configure the processor 452 to generate and transmit an output signal 466 that may include the image data 460, the audio data 462, the text data 464, and/or the motion data 468. In some of the present embodiments, the output signal 466 may be transmitted to the backend server(s) 430 using the communication module 450, and the backend server(s) 430 may transmit (or forward) the output signal 466 to the client device 404. In other embodiments, the output signal 466 may be transmitted directly to the client device 404.

In further reference to FIG. 23, the image data 460 may comprise image sensor data such as (but not limited to) exposure values and data regarding pixel values for a particular sized grid. The image data 460 may include still images, live video, and/or pre-recorded video. The image data 460 may be recorded by the camera 444 in a field of view of the camera 444.

In further reference to FIG. 23, the motion data 468 may comprise motion sensor data generated in response to motion events. For example, in embodiments using a motion sensor 474, the motion data 468 may include an amount or level of a data type generated by the motion sensor 474. In some of the present embodiments, such as those where the A/V recording and communication device is similar to that of the A/V recording and communication doorbell 130 of FIGS. 3-13, the motion data 468 may be generated by the camera 444. In such embodiments, the A/V recording and communication device 402 may not have a motion sensor 474 (as illustrated by the dashed lines around the motion sensor 474 in FIG. 23).

With further reference to FIG. 23, the network access credentials 470 may include the credentials for accessing the user's first network 408, the user's second network, and/or the client network 411. The network access credentials 470 may include, in various embodiments, a service set identifier (SSID), a basic service set identifier (BSSID), a wireless key/password (e.g., WEP, DES, VPN, WPA, WPA2, etc.), a media access control (MAC) address (e.g., the MAC address of the access point generating the user's first network 408), and/or other network access credentials 470. For example, the network access credentials 470 of the A/V recording and communication device 402 may be updated (e.g., during activation) to include the first network credentials 471, where the first network credentials 471 enable the A/V recording and communication device 402 to access the user's first network 408. In some embodiments, the A/V recording and communication device 402 may connect to the client device 404 (e.g., over a Wi-Fi direct network generated by the A/V recording and communication device 402) and the user of the client device 404 may input the first network credentials 471, which may be stored on the A/V recording and communication device 402. In response, the A/V recording and communication device 402 may be able to connect to the user's first network 408.

At a later time, the user/owner of the A/V recording and communication device 402 may move to a new residence or business address, install a new router, subscribe to a new internet service provider (ISP), and/or install a new network for another reason. As a result, the new residence or business address, new router, and/or new ISP may have a new network, such as the user's second network 409. The user's second network 409 may have the third network credentials 472. In order to enable the A/V recording and communication device 402 to connect to the user's second network 409, the network access credentials 470 may need to be updated from the first network credentials 471 to the third network credentials 472. As described herein, in order to accomplish this, the client device 404 may generate the client network 411 having client network credentials 479 (FIG. 25) identical to the first network credentials 471, such that the A/V recording and communication device 402 may connect to and communicate with the client device 404 over the client network 411. Once connected, the client device 404 may transmit the third network credentials 472 to the A/V recording and communication device 402 in order to update the network access credentials 470 of the A/V recording and communication device 402. After the network access credentials 470 are updated to the third network credentials 472, the A/V recording and communication device 402 may be able to connect to and communicate over the user's second network 409.

In some of the present embodiments, the A/V recording and communication device 402 may be disconnected from the user's first network 408 (e.g., in response to a deauthentication request transmitted to the access point of the user's first network 408). In response to being disconnected, the A/V recording and communication device 402 may transmit the access request 476 including the first network credentials 471 for accessing the user's first network 408. However, instead of the access request 476 being received by the access point of the user's first network 408, the access request 476 may be received by the client device 404, which may enable the A/V recording and communication device 402 to connect to and communicate with the client device 404 over the client network 411 (e.g., because the client network credentials 479 included in the access request 476 may be identical to the first network credentials 471).

This process may be performed for one or more A/V recording and communication devices 402, and may be performed for one or more A/V recording and communication devices 402 at the same time. For example, each of the A/V recording and communication devices 402 installed at a residence may all connect to the client network 411 and receive the third network credentials 472 from the client device 404 at the same time. As a result, the user/owner of the A/V recording and communication devices 402 may not have to individually update the network access credentials 470 of each of the A/V recording and communication devices 402, but rather may update them all at the same time, or may update at least two of the devices at a time. By doing so, the user/owner may save time, and by knowing that this capability exists, the user/owner of the A/V recording and communication device 402 may be more likely to update the devices 402 and get the devices 402 online more quickly, thereby more quickly securing his or her home.

Figure 24:
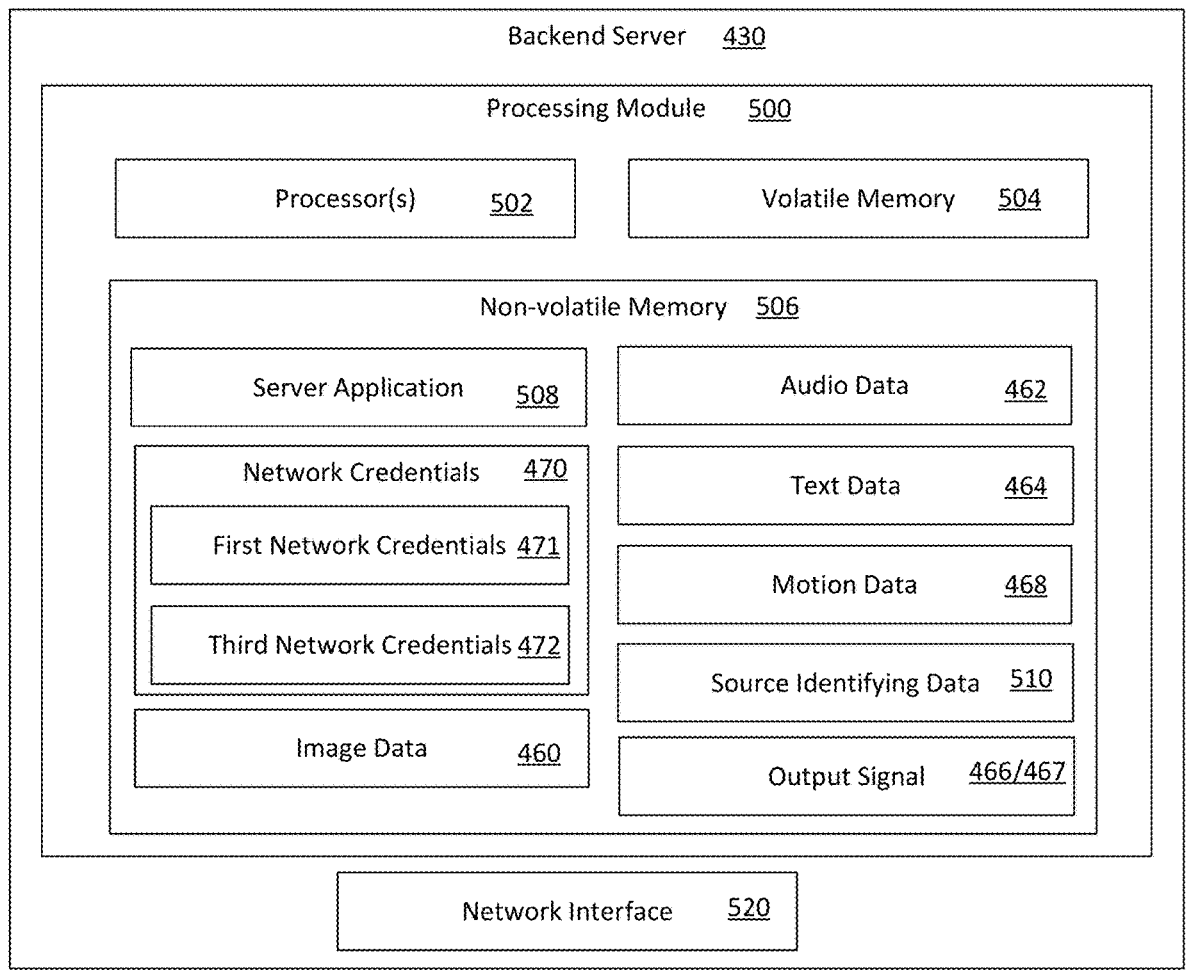
FIG. 24 is a functional block diagram illustrating one embodiment of a backend device according to various aspects of the present disclosure.

FIG. 24 is a functional block diagram illustrating one embodiment of the backend server(s) 430 according to various aspects of the present disclosure. The backend server(s) 430 may comprise a processing module 500 including a processor 502, volatile memory 504, a network interface 520, and non-volatile memory 506. The network interface 520 may allow the backend server(s) 430 to access and communicate with devices connected to the network (Internet/PSTN) 410. The non-volatile memory 506 may include a server application 508 that configures the processor 502 to receive the image data 460, the audio data 462, the text data 464, the network access credentials 470, and/or the motion data 468 from the A/V recording and communication device(s) 402 and/or the client device(s) 404 (e.g., in the output signal 466, 467).

In further reference to FIG. 24, the non-volatile memory 506 may also include source identifying data 510 that may be used to identify the A/V recording and communication devices 402 and/or the client device 404. In some of the present embodiments, such as where the client device 404 does not have the first network credentials 471 of the user's first network 408 stored, the client device 404 may query the backend server 430 for the first network credentials 471. In such an embodiment, the backend server 430 may use the source identifying data 410 to identify the client device 404 and then identify, using the source identifying data 410, the A/V recording and communication device(s) 402 associated with the client device 404. In response to identifying the A/V recording and communication device(s) 402 associated with the client device 404, the backend server 430 may determine the network access credentials 470 of the A/V recording and communication device(s) 402 and transmit the network access credentials 470 to the client device 404 (e.g., the first network credentials 471 when the A/V recording and communication device 402 is or was last connected to the user's first network 408). As a result, the client device 404 may use the network access credentials 470 of the A/V recording and communication device(s) 402 to generate the client network credentials 479 for the client network 411. As such, when the A/V recording and communication device(s) 402 transmit the access requests 476 using the network access credentials 470 (e.g., in order to connect to the user's first network 408), the client device 404 may receive the access requests 476 and establish a connection to the A/V recording and communication device(s) 402.

In some of the present embodiments, such as those including multiple A/V recording and communication devices 402, the backend server 430 may store the network access credentials 470 of each of the A/V recording and communication devices 402. In addition, the backend server 430 may store each of the network access credentials 470 input by the user of the client device 404. For example, each time the A/V recording and communication device 402 is connected to a network, the network access credentials 470 may be transmitted to the backend server 430 over the network (Internet/PSTN) 410 and may be stored by the backend server 430. In addition, each time the client device 404 updates the network access credentials 470, or inputs the network access credentials 470 using the client application 540 to be used for updating the network access credentials 470 of the A/V recording and communication device 402, the client device 404 may transmit the network access credentials 470 to the backend server 430 over the network (Internet/PSTN) 410 and the network access credentials 470 may be stored by the backend server 430. As such, when the user of the client device 404 logs into the client application 540 on a different client device, such as a new client device or a device that has not connected to the network to which the A/V recording and communication device 402 is connected, the client device 404 can request the network access credentials 470 from the backend server 430, as described above, and the network access credentials 470 may be used to generate the client network 411.

Now referring to FIG. 25, FIG. 25 is a functional block diagram illustrating one embodiment of a client device 404 according to various aspects of the present disclosure. The client device 404 may comprise a processing module 532 that is operatively connected to an input interface 524, a microphone 527, a speaker 528, and a communication module 530. The client device 404 may further comprise a camera (not shown) operatively connected to the processing module 532. The processing module 532 may comprise a processor 534, volatile memory 536, and non-volatile memory 538 that includes a client application 540. In various embodiments, the client application 540 may configure the processor 534 to receive input(s) to the input interface 524 (e.g., requests to reconfigure the A/V recording and communication device 402 (FIG. 32)) and/or to capture the audio data 463 using the microphone 527, for example. In addition, the client application 540 may configure the processor 534 to transmit the network access credentials 470, the client network credentials 479, and/or the output signal 467 to the A/V recording and communication device 402 and/or the backend server(s) 430 using the communication module 530.

With further reference to FIG. 25, the input interface 524 may include a display 525. The display 525 may include a touchscreen, such that the user of the client device 404 can provide inputs directly to the display 525 (e.g., a request for updating the network access credentials 470 of the A/V recording and communication device 402). In some embodiments, the client device 404 may not include a touchscreen. In such embodiments, the user may provide an input using any input device, such as, without limitation, a mouse, a trackball, a touchpad, a joystick, a pointing stick, a stylus, etc.

Figure 31:
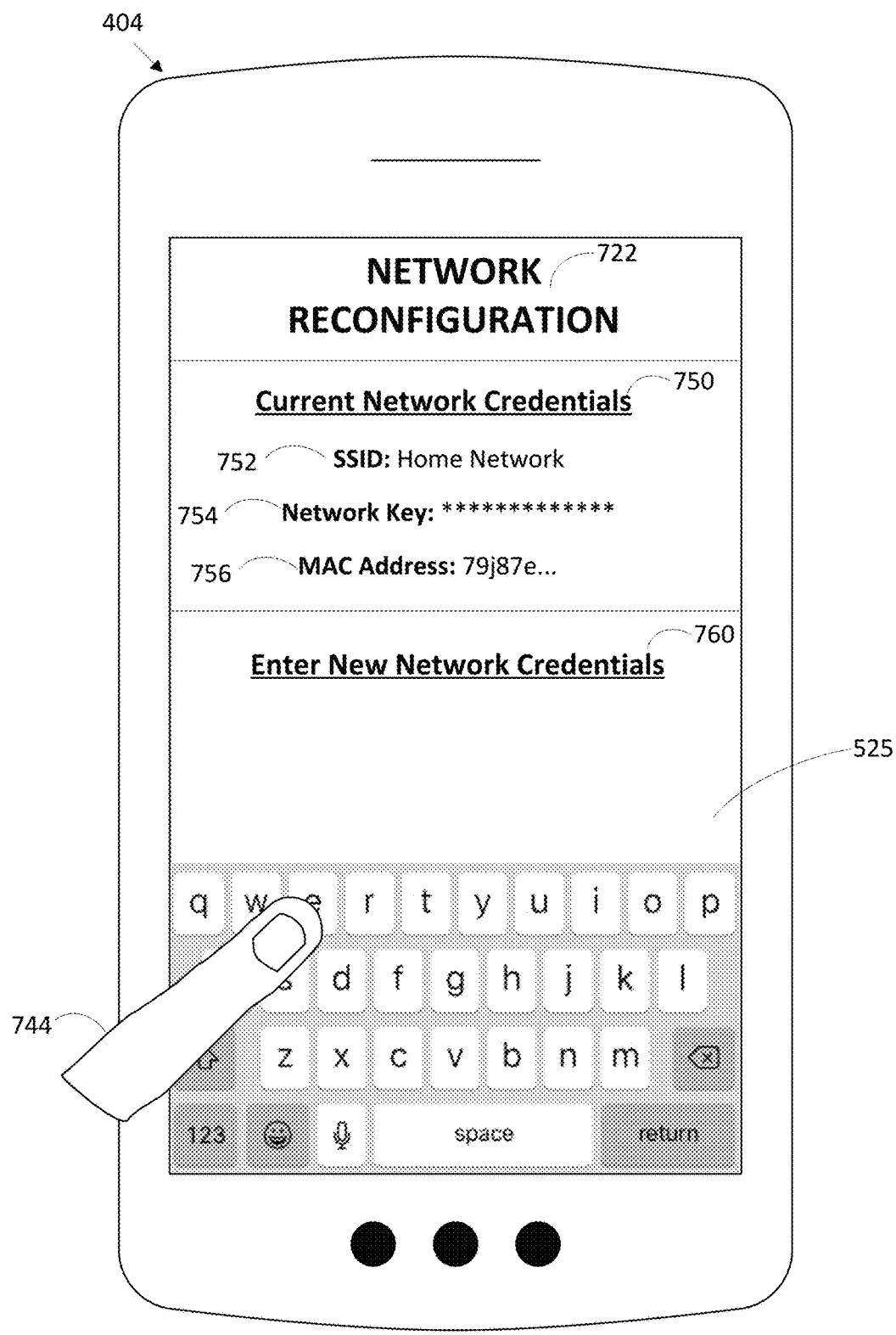
FIGS. 31-32 are screenshots of a graphical user interface (GUI) illustrating aspects of a process for migrating A/V recording and communication devices to new networks according to various aspects of the present disclosure.

With further reference to FIG. 25, the processor 534 of the client device 404 may be configured to generate the client network 411 using the communication module 530. As described herein, the client network 411 may be an ad hoc network such as a wireless ad hoc network (WANET), a mobile ad hoc network (MANET), a smart phone ad hoc network (SPAN), or a Wi-Fi ad hoc network. In some of the present embodiments, the client network 411 may be a Wi-Fi direct network. In some of the present embodiments, the client network 411 may be a cellular wireless network, such as where the client device 404 acts as a mobile hotspot. The client network 411 may be generated by the client device 404 to have the client network credentials 479 that are identical to the network access credentials 470 of the A/V recording and communication device 402. For example, in some of the present embodiments, as described above, the client device 404 may store the network access credentials 470 of the A/V recording and communication device 402 (e.g., during an activation process) and/or may receive the network access credentials 470 of the A/V recording and communication device 402 from the backend server 430. In such embodiments, the client network credentials 479 may be automatically generated based on the network access credentials 470 of the A/V recording and communication device 402. In other embodiments, the user of the client device 404 may input the network access credentials 470 of the A/V recording and communication device 402 (e.g., by inputting the current network credentials 750 on the display 525 as illustrated in FIG. 31). In such embodiments, the client network credentials 479 may be generated in response to the user's input.

In the illustrated embodiment of FIGS. 23-25, the various components including (but not limited to) the processing modules 446, 532, 500, the communication modules 450, 530, and the network interface 520 are represented by separate boxes. The graphical representations depicted in each of FIGS. 23-25 are, however, merely examples, and are not intended to indicate that any of the various components of the A/V recording and communication device 402, the client device 404, or the backend server(s) 430 are necessarily physically separate from one another, although in some embodiments they might be. In other embodiments, however, the structure and/or functionality of any or all of the components of the A/V recording and communication device 402 may be combined. In addition, in some embodiments the communication module 450 may include its own processor, volatile memory, and/or non-volatile memory. Further, the structure and/or functionality of any or all of the components of the client device 404 may be combined. In addition, in some embodiments the communication module 530 may include its own processor, volatile memory, and/or non-volatile memory. Further, the structure and/or functionality of any or all of the components of the backend server(s) 430 may be combined. In addition, in some embodiments the network interface 520 may include its own processor, volatile memory, and/or non-volatile memory.

Figure 26:
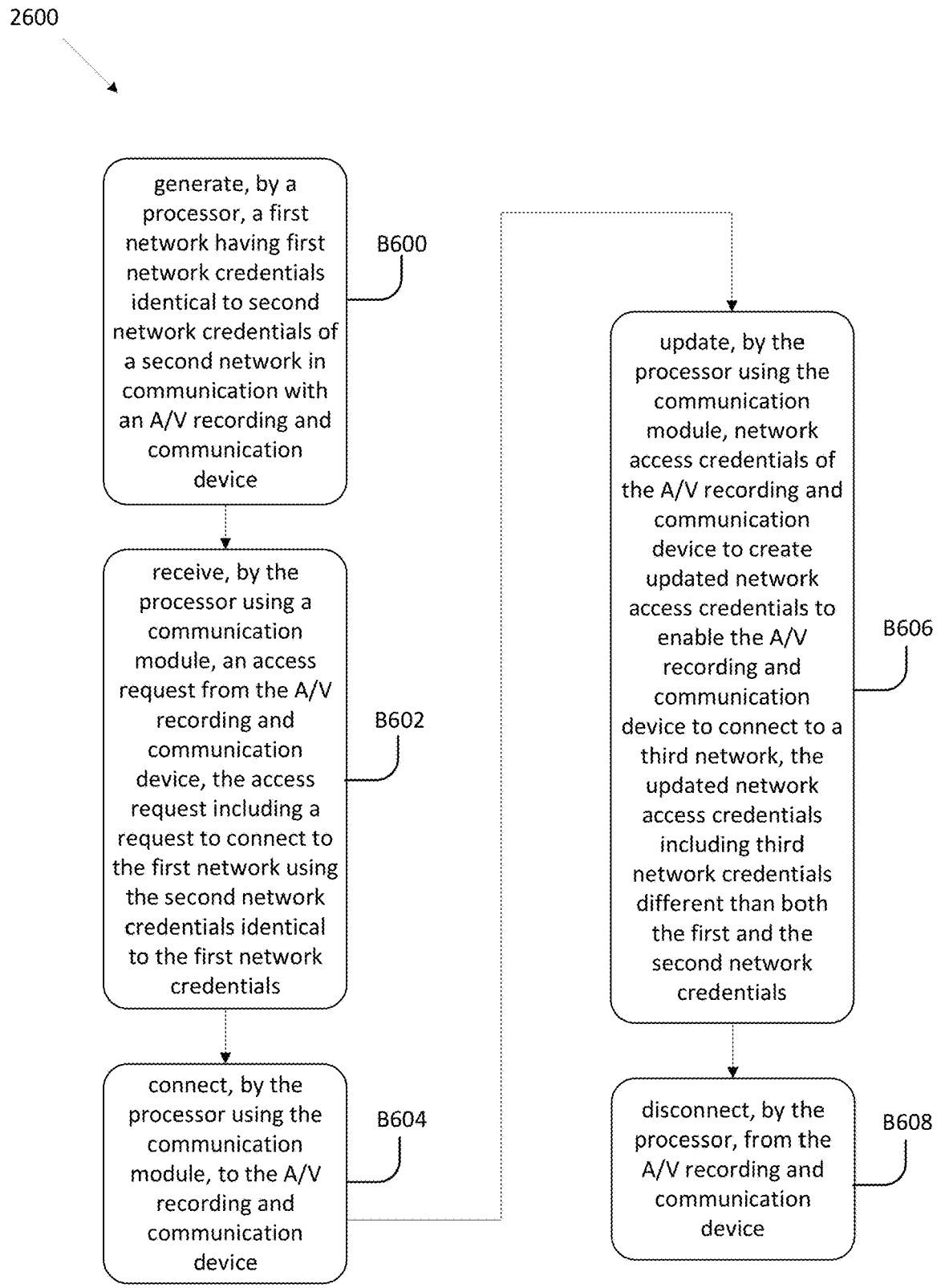
FIGS. 26-29 are flowcharts illustrating processes for migrating A/V recording and communication devices to new networks according to various aspects of the present disclosure.

Now referring to FIG. 26, FIG. 26 is a flowchart illustrating a process for migrating A/V recording and communication devices to new networks according to various aspects of the present disclosure. The process 2600, at block B600, generates, by a processor, a first network having first network credentials identical to second network credentials of a second network in communication with an A/V recording and communication device. For example, the processor 534 of the client device 404, using the communication module 530, may generate the client network 404 having the client network credentials 479 identical to the first network credentials 471 of the user's first network 408. As discussed above, the client device 404 may know the first network credentials 471 from storing the first network credentials 471 during an activation and/or setup process with the A/V recording and communication device 402, from connecting to the user's first network 408, from receiving the first network credentials 471 from the backend server 430 (e.g., in response to querying the backend server 430), and/or from receiving the first network credentials 471 in response to the first network credentials 471 being input by the user of the client device 404 (as illustrated in FIG. 31). In any embodiment, the client device 404 may use the first network credentials 471 to determine the client network credentials 479 for generating the client network 411. The client device 404 may generate the client network 411 in response to a request from the user of the client device 404 using the client application 540. For example, the user may be able to input a selection on the display 525 of the client device 404 for putting the client device 404 into a network reconfiguration mode 722 (FIG. 31) for reconfiguring the A/V recording and communication device(s) 402. In response to the selection, the processor 534 of the client device 404, using the communication module 530, may generate the client network 411.

The process 2600, at block B602, receives, by the processor using a communication module, an access request from the A/V recording and communication device, the access request including a request to connect to the first network using the second network credentials identical to the first network credentials. For example, the processor 534 of the client device 404 may receive the access request 476 from the A/V recording and communication device 402 using the communication module 530, where the access request 476 includes the first network credentials 471 of the user's first network 408, which are identical to the client network credentials 479 of the client network 411 generated by the client device 404.

Figure 32:
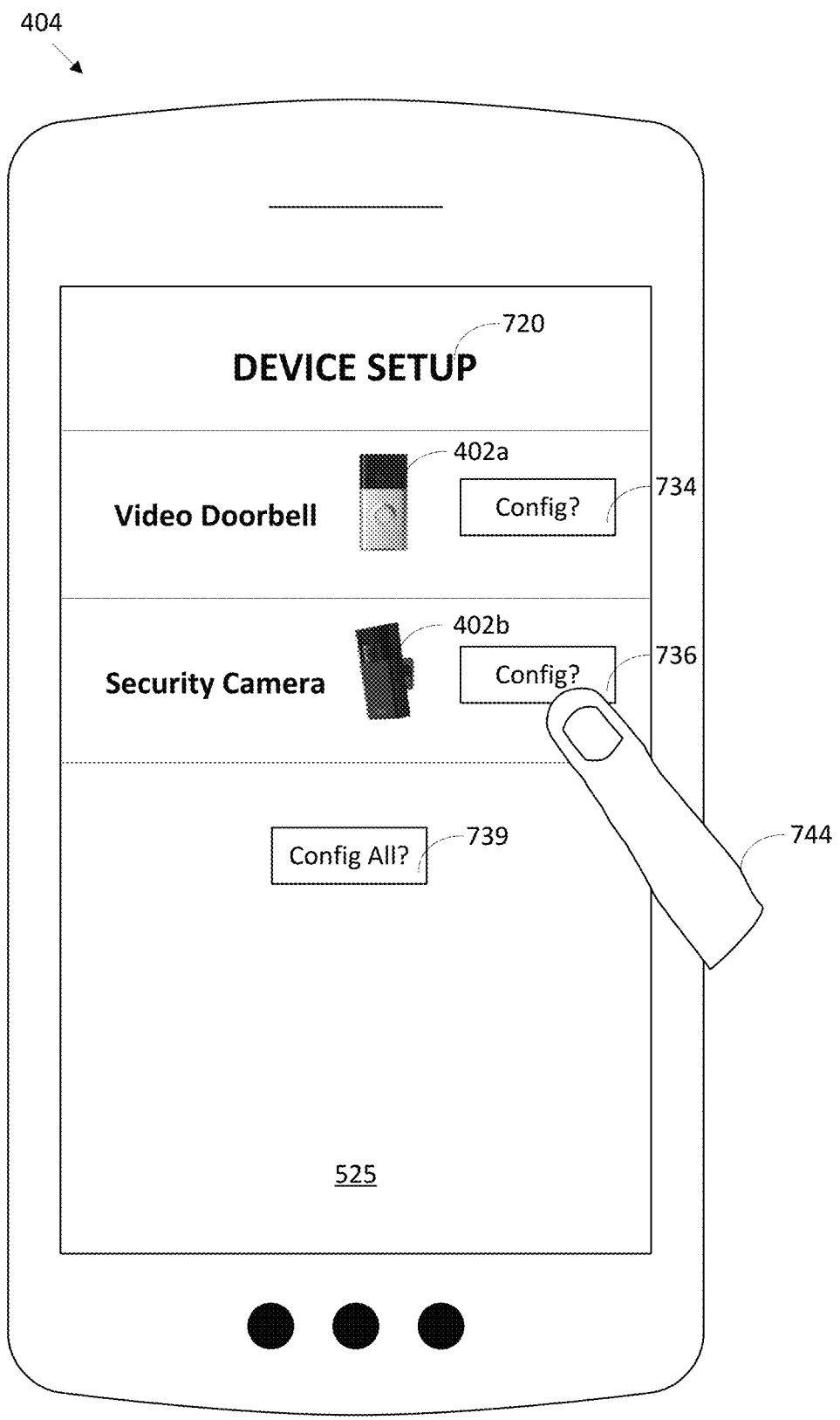

The process 2600, at block B604, connects, by the processor using the communication module, to the A/V recording and communication device 402. For example, the processor 534 of the client device 404 may connect to the A/V recording and communication device 402 using the communication module 530. As a result of the first network credentials 471 being identical to the client network credentials 479, the A/V recording and communication device 402 is able to connect to the client network 411. By connecting to the client network 411 (being broadcast by the client device 404), the A/V recording and communication device 402 and the client device 404 may be connected and able to communicate across the client network 411. Once connected, the user of the client device 404 may be able view and manage the A/V recording and communication device 402 (and other A/V recording and communication devices) using the client application 540, for example. In such an example, in response to receiving the access request 476 and connecting to the A/V recording and communication device 402, the client device 404 may populate the client application 540 with each of the A/V recording and communication devices 402 connected over the client network 411 and capable of being managed by the client device 404 (e.g., via the client application 540) (e.g., as illustrated in FIG. 32).

The process 2600, at block B606, updates, by the processor using the communication module, network access credentials of the A/V recording and communication device to create updated network access credentials to enable the A/V recording and communication device to connect to a third network, the updated network access credentials including third network access credentials different than both the first and the second network access credentials. For example, once connected at block B604, the processor 534 of the client device 404 may update the network access credentials 470 of the A/V recording and communication device 402 from the first network credentials 471 to the third network credentials 472. In such an example, the third network credentials 472 may be different than both the first network credentials 471 and the client network credentials 479 and the third network credentials 472 may enable the A/V recording and communication device 402 to connect to the user's second network 409. In some of the present embodiments, the client device 404 may store the third network credentials 472 in response to connecting to the user's second network 409. For example, the client device 404 may join the user's second network 409, and in response, may save the third network credentials 472. In some of the present embodiments, the third network credentials 472 may be input by the user of the client device 404 when joining the user's second network 409. In other embodiments, the user of the client device 404 may input the third network credentials 472 during the reconfiguration process of the A/V recording and communication device 402 through the client application 540 (e.g., the user may input the new network credentials 760 on the display 525 of the client device 404 using the client application 540 (FIG. 31)). In yet another embodiment, the client device 404 may retrieve the third network credentials 472 from the backend server 430. In either embodiment, the client device 404 may use the third network credentials 472 to update the network access credentials 470 of the A/V recording and communication device 402 to enable the A/V recording and communication device 402 to connect to and communicate across the user's second network 409.

The process 2600, at block B608, disconnects, by the processor, from the A/V recording and communication device 402. For example, the processor 534 of the client device 404 may disconnect from the A/V recording and communication device 402. In some of the present embodiments, once the network access credentials 470 of the A/V recording and communication device 402 are updated at block B606, the A/V recording and communication device 402 may be disconnected because the A/V recording and communication device 402 may no longer be programmed to access the client network 411 (e.g., is no longer configured with the network access credentials 470 for connecting to the client network 411). In another embodiment, the client device 404 may stop broadcasting the client network 411 (e.g., in response to the user of the client device 404 exiting the network reconfiguration mode 722 in the client application 540 (FIG. 31)).

The process of FIG. 26 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

Figure 30:
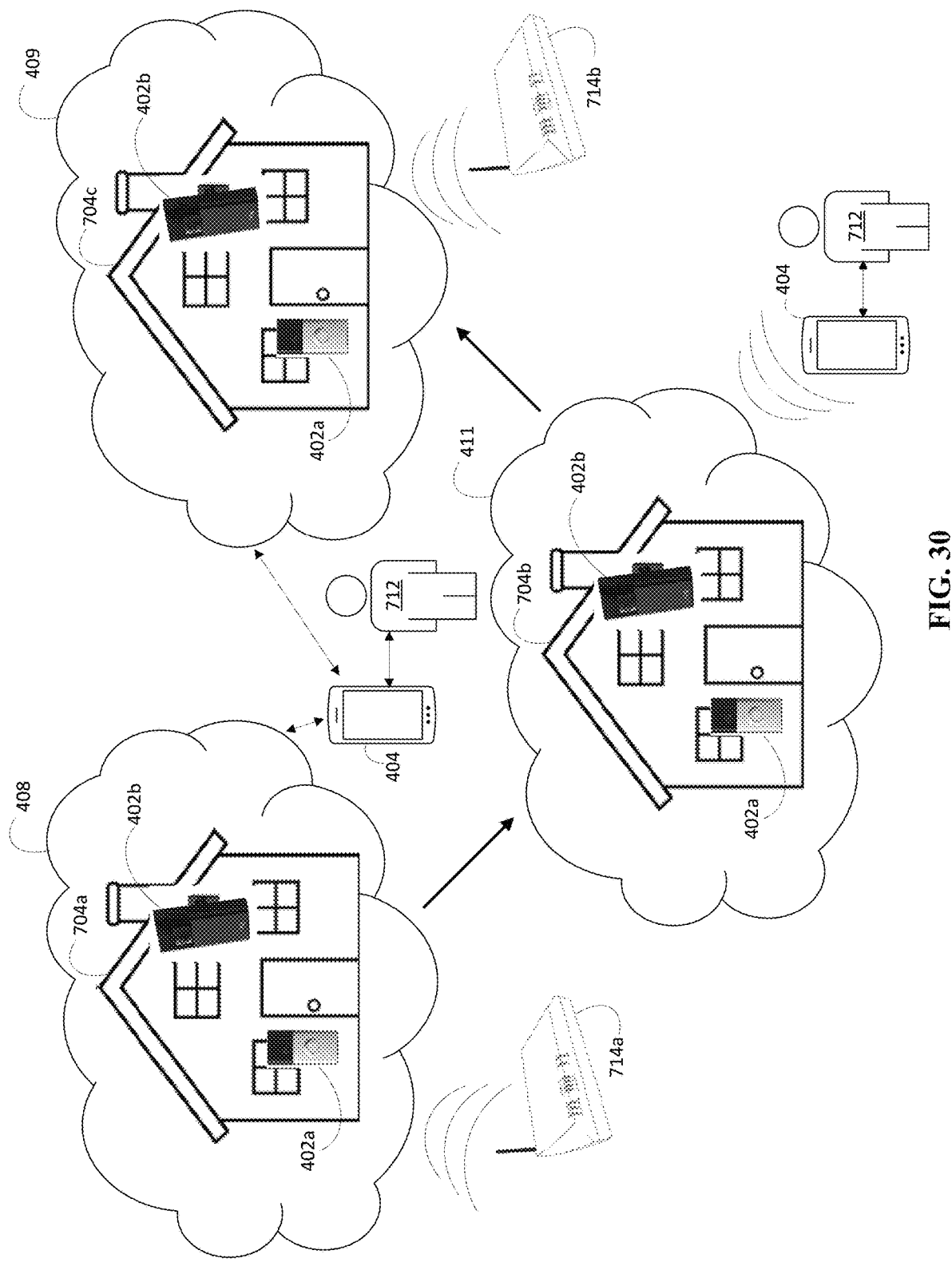
FIG. 30 is an example environment illustrating aspects of a process for migrating A/V recording and communication devices to new networks according to various aspects of the present disclosure.

With reference to FIGS. 30-32, the A/V recording and communication devices 402a and 402b may be connected to the user's first network 408 at the home 704a (FIG. 30). The A/V recording and communication device 402a may be a video doorbell and the A/V recording and communication device 402b may be a security camera, for example. Although only the A/V recording and communication devices 402a, 402b are illustrated in FIG. 30, in other embodiments, any number of A/V recording and communication devices 402 may be implemented without departing from the scope of the present disclosure. In addition, although the A/V recording and communication devices 402a, 402b are referred to as a video doorbell and a security camera in FIGS. 30-32, any other A/V recording and communication devices 402 may be implemented in addition to, or in place of, the video doorbell 402a and the security camera 402b. For example, the A/V recording and communication devices 402 may include floodlight security cameras, spotlight security cameras, security cameras, video doorbells, indoor security cameras, pet cameras, baby monitors, etc.

The user's first network 408 may be a wireless network broadcast by the router 714a. The user's first network 408 may include the first network credentials 471, and each of the A/V recording and communication devices 402a, 402b may include the first network credentials 471 as the network access credentials 470 such that the A/V recording and communication devices 402a, 402b may be configured to communicate over the user's first network 408 to connect to the network (Internet/PSTN) 410 (FIG. 22), for example. In some of the present embodiments, the client device 404 may also be connected to the user's first network 408, and, as a result, may have the first network credentials 471 stored on the client device 404.

In this example embodiment, the user/owner of the A/V recording and communication devices 402a, 402b may move to a new home 704c (in such an example, the home 704b and 704c may be the same home), may install a new router 714b at his or her home 704a (e.g., in response to switching ISPs; in such an example, the homes 704a, 704b, 704c may be the same home), may update the network credentials from the first network credentials 471 to the third network credentials 472 (e.g., if unwanted persons are using the user's first network 408; in such an example, the homes 704a, 704b, 704c may be the same home), may transfer ownership of the A/V recoding and communication devices 402a, 402b to a new owner/user (requiring the new owner/user to update the network access credentials 470 of the A/V recording and communication devices 402 to allow the A/V recording and communication devices 402 to connect to the user's second network 409; in such an example, the homes 704b, 704c may be the same home), and/or any other scenario in which the user/owner may change to the user's second network 409 from the user's first network 408 prompting the need for updating the network access credentials 470 of the A/V recording and communication devices 402a, 402b.

In response to the A/V recording and communication devices 402a, 402b requiring an update to the network access credentials 470, the client device 404 may generate the client network 411 having client network credentials 479 identical to the first network credentials 471 of the user's first network 408 (at block B600). For example, the user 712 of the client device 404 may put the client device 404, using the client application 540, into the network reconfiguration mode 722 (FIG. 31). Once in the network reconfiguration mode 722, the current network credentials 750 (e.g., the first network credentials 471) may be populated. In some of the present embodiments, the user 712 may input the current network credentials 750 which may include the first network credentials 471 that the A/V recording and communication devices 402a, 402b currently use to connect to and communicate over the user's first network 408. In other embodiments, as described above, the client device 404 may know the current network credentials 750, such as where the client device 404 was also connected to the user's first network 408 and/or where the client device 404 retrieved the current network credentials 750 from the backend server 430. The new network credentials 760 may also be populated in the network reconfiguration mode 722. In some of the present embodiments, the new network credentials 760 (e.g., the third network credentials 472 for connecting to the user's second network 409) may be input by the user 712 of the client device 404. In other embodiments, the client device 404 may know the new network credentials 760, such as where the client device 404 is connected to and/or has been connected to the user's second network 409, and/or where the client device 404 has retrieved the third network credentials 472 from the backend server 430. In response to populating the current network credentials 750 and/or the new network credentials 760, the processor 534 of the client device 404, using the communication module 530, may generate the client network 411 having client network credentials 479 identical to the current network credentials 750 (at block B600).

In response to generating the client network 411, the client device 404 may receive, by the processor 534 using the communication module 530, over the client network 411, the access request 476 from at least one of the A/V recording and communication devices 402a, 402b, where the access request 476 may include a request to access the client network 411 using the first network credentials 471 (at block B602). However, because the first network credentials 471 may be identical to the client network credentials 479, the A/V recording and communication devices 402a, 402b may be able to connect to the client network 411. In response to receiving the access request(s) 476 from the A/V recording and communication devices 402a, 402b, the client device 404 may populate a device setup list 720 (FIG. 32) in the client application 540 with each of the A/V recording and communication devices 402a, 402b attempting to connect to the client network 411 (e.g., each of the devices 402a, 402b capable of communication with the client device 404 over the client network 411). The user 712 of the client device 404 may then be able to select which of the A/V recording and communication devices 402a, 402b to reconfigure (e.g., by selecting at least one of the reconfiguration buttons 734, 736 and/or the reconfigure all button 739). In response to selecting at least one of the A/V recording and communication devices 402a, 402b, the client device 404 may connect to the at least one A/V recording and communication devices 402a, 402b over the client network 411 (at block B604). In some of the present embodiments, in response to receiving the access request(s) 476, the client device 404 may automatically connect to the A/V recording and communication devices 402a, 402b without requiring the user 712 to make a selection. In such embodiments, the device setup list 720 may include the already connected A/V recording and communication devices 402a, 402b, and the selection of which of the A/V recording and communication devices 402a, 402b to reconfigure may be for the purpose of determining which of the A/V recording and communication devices 402a, 402b should have the network access credentials 470 updated (e.g., in embodiments where the user/owner may not wish to update all of the devices 402a, 402b, and/or may want one or more of the devices 402a, 402b to be connected to a separate network than one or more of the other devices 402a, 402b).

In some of the present embodiments, the device setup list 720 may list each of the A/V recording and communication devices 402a, 402b installed at the home 704a, 704b, 704c whether or not the access requests 476 have been received (e.g., when the A/V recording and communication device(s) 402a, 402b are outside of the range of the client network 411). In such embodiments, the client device 404 may save the list during activation/setup of the A/V recording and communication devices 402a, 402b. In other embodiments, the client device 404 may receive an identification of the A/V recording and communication devices 402a, 402b from the backend server 430 using the client application 540 (e.g., when the user logs in to the client application 540, the A/V recording and communication devices 402a, 402b associated with the user's account may be populated).

In response to establishing a connection/communication with the A/V recording and communication device(s) 402a, 402b over the client network 411, the client device 404 may update the network access credentials 470 of the A/V recording and communication device(s) 402a, 402b (at block B606). For example, the client device 404 may update the network access credentials 470 from the current network credentials 750 (e.g., the first network credentials 471) to the new network credentials 760 (e.g., the third network credentials 472).

After updating the network access credentials 470 of the A/V recording and communication device(s) 402a, 402b (at block B606), the client device 404 may disconnect from the A/V recording and communication devices 402a, 402b (at block B608). As described above, in some of the present embodiments, after the network access credentials 470 of the A/V recording and communication device 402 are updated, the A/V recording and communication device 402 may no longer be configured to access the client network 411 (e.g., the network access credentials 470 do not match the client network credentials 479), and as a result, the A/V recording and communication device 402 may be disconnected from the client network 411. In other embodiments, the client device 404 may stop broadcasting the client network 411 (e.g., in response to the user 712 exiting the network reconfiguration mode 722).

In some of the present embodiments, such as where the A/V recording and communication devices 402a, 402b are separated from one another by a large enough distance that the client network 411 may not be able to communicate with each of the A/V recording and communication devices 402a, 402b at one time, the user of the client device 404 may be able to connect to the A/V recording and communication device(s) 402a, 402b in one location, and then move to another location to connect to other A/V recording and communication device(s) 402a, 402b, and so on. In such embodiments, the user 712 may be able to keep the client application 540 in the network reconfiguration mode 722 until each of the A/V recording and communication device(s) 402a, 402b are updated. For example, in some of the present embodiments, as described above, the client device 404 may be aware of each of the A/V recording and communication devices 402a, 402b installed at the home 704a, 704b, 704c. In such an example, the device setup list 720 may be populated with each of the A/V recording and communication devices 402a, 402b installed at the home, and the configuration button 734, 736 may not appear next to the A/V recording and communication device(s) 402a, 402b until the A/V recording and communication devices 402a, 402b are within the range of the client network 411.

As a result of the network access credentials 470 of the A/V recording and communication devices 402a, 402b being updated (at block B606 of FIG. 26), the access request(s) transmitted by the A/V recording and communication devices 402a, 402b may now include the third network credentials 472 for accessing the user's second network 409. As such, the A/V recording and communication devices 402a, 402b may be able to connect to and communicate over the user's second network 409 to access the network (Internet/PSTN) 410 (FIG. 22). For example, where the user/owner of the A/V recording and communication devices 402a, 402b moves to a new home 704c, and installs the router 714b broadcasting the user's second network 409, after the process 2600 the A/V recording and communication devices 402a, 402b may connect automatically to the user's second network 409 without the user/owner having to manually update each of the A/V recording and communication devices 402a, 402b individually, and/or without having to manually put each of the A/V recording and communication devices 402a, 402b into a setup/activation mode (e.g., by pushing a button on the back of the A/V recording and communication devices 402a, 402b).

In another example, where the user/owner updates the network credentials of the router 714a, 714b, or installs a new router 714b at his or her home 704c (the home 704a, 704b, 704c may be the same home in this example), after the process 2600 the A/V recording and communication devices 402a, 402b may connect automatically to the user's second network 409 without the user/owner having to manually update each of the A/V recording and communication devices 402a, 402b individually, and/or without having to manually put each of the A/V recording and communication devices 402a, 402b into a setup/activation mode. This advantage may prove especially effective and efficient when there are multiple A/V recording and communication devices 402a, 402b, and/or when at least one of the A/V recording and communication devices 402a, 402b is mounted in a hard-to-access location, such as to a roof, for example.

Figure 27:
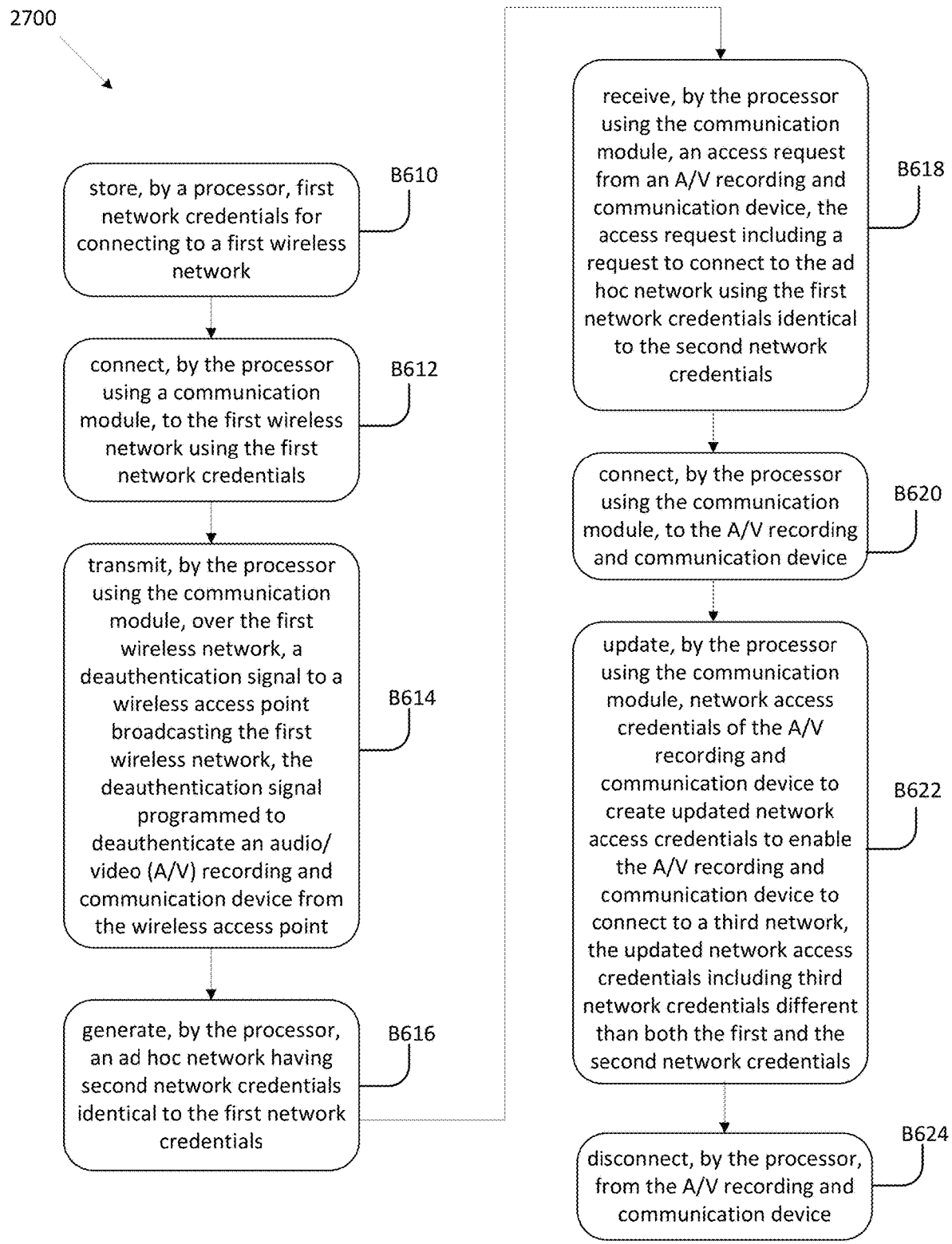

Now referring to FIG. 27, FIG. 27 is a flowchart illustrating a process for migrating A/V recording and communication devices to new networks according to various aspects of the present disclosure. The process 2700, at block B610, stores, by a processor, first network credentials for connecting to a first wireless network. For example, the processor 534 of the client device 404 may store the first network credentials 471 for connecting to the user's first network 408. The client device 404 may store the first network credentials 471 in response to the client device 404 attempting to connect to the user's first network 408 for the first time (e.g., if the user's first network 408 is the home network of the user of the client device 404). In other embodiments, the client device 404 may request that the user input the first network credentials 471 in response to entering the network reconfiguration mode 722 (e.g., the user 712 may access the network reconfiguration mode 722 of FIG. 31 and be prompted to input the current network credentials 750).

The process 2700, at block B612, connects, by the processor using a communication module, to the first wireless network using the first network credentials. For example, the processor 534 of the client device 404, using the communication module 530, may connect to the user's first network 408 (where the user's first network 408 is a wireless network) using the first network credentials 471. The client device 404 may connect to the wireless access point (e.g., router) broadcasting the user's first network 408. In some of the present embodiments, the client device 404 may have a wired connection to the access point (e.g., using an Ethernet cable).

The process 2700, at block B614, transmits, by the processor using the communication module, over the first wireless network, a deauthentication signal to a wireless access point broadcasting the first wireless network, the deauthentication signal programmed to deauthenticate an A/V recording and communication device from the wireless access point. For example, the processor 534 of the client device 404, using the communication module 530, may transmit a deauthentication signal to the wireless access point (e.g., router) broadcasting the user's first network 408 in order to deauthenticate (and thereby disconnect) the A/V recording and communication device 402 from the wireless access point.

In some of the present embodiments, the deauthentication signal may be a deauthentication frame sent to the wireless access point (e.g., router) configured to deauthenticate the A/V recording and communication device 402 from the wireless access point (e.g., according to the deauthentication frame provision of the IEEE 802.11 protocol). In such embodiments, the client device 404 may determine the basic service set identifier (BSSID, e.g., MAC address) of the wireless access point (e.g., the router 714a of FIG. 30). The BSSID may be input by the user of the client device 404, may be determined by the client device 404 from the client device's 404 connection to the wireless access point (e.g., based on the client device's 404 connection to the user's first network 408), and/or may be retrieved from the backend server 430 (e.g., where the backend server 430 stored the BSSID of the wireless access point in response to the setup/activation of the A/V recording and communication device 404). In some of the present embodiments, the BSSID of the wireless access point may be included in the first network credentials 471. In addition to determining the BSSID of the wireless access point, the client device 404 may determine the MAC address of the A/V recording and communication device 402. The MAC address may be known from the setup/activation process, may be input by the user, and/or may be retrieved from the backend server 430. In some of the present embodiments, the MAC address of the A/V recording and communication device 402 may be stored as part of the source identifying data 410 on the backend server 430. Once the BSSID of the wireless access point and the MAC address of the A/V recording and communication device 402 are known, the client device 404 may transmit the deauthentication frame to the wireless access point for deauthenticating the A/V recording and communication device 402.

The process 2700, at block B616, generates, by the processor, an ad hoc network having second network credentials identical to the first network credentials. For example, the processor 534 of the client device 404, using the communication module 530, may generate the client network 411, where the client network 411 is an ad hoc network. As described above, the ad hoc network may be a wireless ad hoc network (WANET), a mobile ad hoc network (MANET), a smart phone ad hoc network (SPAN), and/or a Wi-Fi ad hoc network. In some of the present embodiments, the client device 404 may act as a wireless hotspot.

The process 2700, at block B618, receives, by the processor using the communication module, an access request from an A/V recording and communication device, the access request including a request to connect to the ad hoc network using the first network credentials identical to the second network credentials. For example, the processor 534 of the client device 404, using the communication module 530, may receive the access request 476 from the A/V recording and communication device 402, where the access request 476 includes a request to connect to the client network 411 using the first network credentials 471 that are identical to the client network credentials 479. For example, as a result of the A/V recording and communication device 402 being deauthenticated (and disconnected) from the access point, the A/V recording and communication device 402 may continue to try and connect to the user's first network 408 by transmitting the access requests 476. As described above, once the access request 476 is received, the client application 540 may display the device setup list 720 (FIG. 32) including the A/V recording and communication device(s) 402 that have transmitted the access request(s) 476 and are available for connection/reconfiguration/updating by the client device 404. This process may be similar to that of block B602 of the process 2600 of FIG. 26, described above.

The process 2700, at block B620, connects, by the processor using the communication module, to the A/V recording and communication device. For example, the processor 534 of the client device 404 may connect to the A/V recording and communication device 404 over the client network 411 using the communication module 530, where the client network 411 may be an ad hoc network. This process may be similar to that of block B604 of the process 2600 of FIG. 26, described above.

The process 2700, at block B622, updates, by the processor using the communication module, network access credentials of the A/V recording and communication device to create updated network access credentials to enable the A/V recording and communication device to connect to a third network, the updated network access credentials including third network credentials different than both the first and the second network credentials. For example, the processor 534 of the client device 404, using the communication module 530, may update the network access credentials 470 of the A/V recording and communication device 402 from the first network credentials 471 (e.g., the current network credentials 450 of FIG. 31) to the third network credentials 472 (e.g., the new network credentials 460 of FIG. 31) for enabling the A/V recording and communication device 402 to connect to the user's second network 409. As described herein, the third network credentials 472 may be different than the first network credentials 471 and the client network credentials 479. This process may be similar to that of block B606 of the process 2600 of FIG. 26, described above.

The process 2700, at block B624, disconnects, by the processor, from the A/V recording and communication device. For example, the processor 534 of the client device 404 may disconnect the client device 404 from the A/V recording and communication device 402 after updating the network access credentials 470. This process may be similar to that of block B608 of the process 2600 of FIG. 26, described above.

The process 2800 of FIG. 28 and the process 2900 of FIG. 29 described below may be similar to the process 2600 of FIG. 26 and the process 2700 of FIG. 27 described above; however, the processes 2800 and 2900 may be directed primarily to the processes executed by the A/V recording and communication device 402 within the system 400, while the processes 2600 and 2700 may be directed primarily to the processes executed by the client device 404 within the system 400. For example, at block B600 of the process 2600 of FIG. 26, the client device 404 may generate the client network 411 having client network credentials 479 identical to the first network credentials 471 and at block B628 of the process 2800 of FIG. 28 the A/V recording and communication device 402 may connect to the client network 411 using the first network credentials 471 that are identical to the client network credentials 479.

Figure 28:
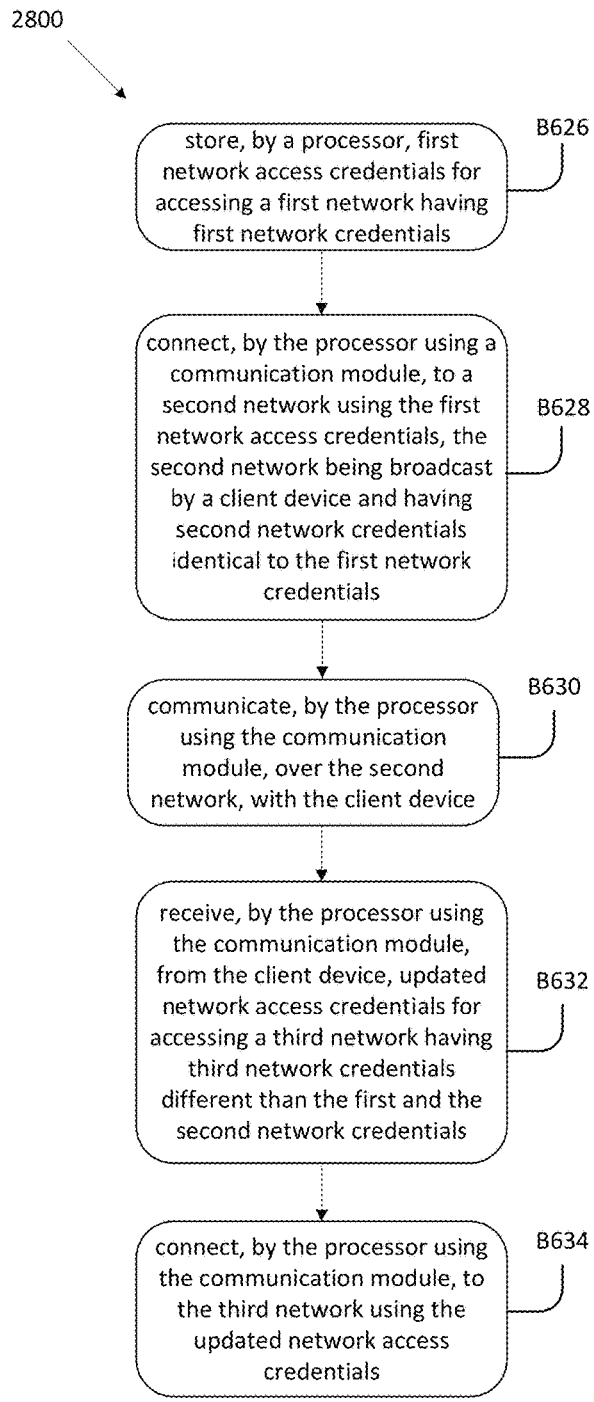

Now referring to FIG. 28, FIG. 28 is a flowchart illustrating a process for migrating A/V recording and communication devices to new networks according to various aspects of the present disclosure. The process 2800, at block B626, stores, by a processor, first network access credentials for accessing a first network having first network credentials. For example, the processor 452 of the A/V recording and communication device 402 may store the first network credentials 471 as the network access credentials 470 for accessing the user's first network 408. The A/V recording and communication device 402 may store the first network access credentials 471 during a setup/activation process of the A/V recording and communication device 402. For example, as described above, the A/V recording and communication device 402 may establish a connection to the client device 404 (e.g., via a Wi-Fi direct network generated by the A/V recording and communication device 402) and the user of the client device 402 may input the first network credentials 471, which may be communicated to the A/V recording and communication device 402 and stored on the A/V recording and communication device 402.

The process 2800, at block B628, connects, by the processor using a communication module, to a second network using the first network access credentials, the second network being broadcast by a client device and having second network access credentials identical to the first network access credentials. For example, the processor 452 of the A/V recording and communication device 402, using the communication module 450, may connect to the client network 411 using the first network credentials 471 that are identical to the client network credentials 479 of the client network 411 being broadcast by the client device 404.

The process 2800, at block B630, communicates, by the processor, using the communication module, over the second network, with the client device. For example, the processor 452 of the A/V recording and communication device 402, using the communication module 450, may communicate with the client device 404 over the client network 411.

The process 2800, at block B632, receives, by the processor using the communication module, from the client device, updated network access credentials for accessing a third network having third network credentials different than the first and the second network credentials. For example, the processor 452 of the A/V recording and communication device 402, using the communication module 450, may receive from the client device 404 the third network credentials 472 for updating the network access credentials 470 of the A/V recording and communication device 402 from the first network credentials 471. After the network access credentials 470 are updated, the A/V recording and communication device 402 may be disconnected from the client device 404 (e.g., be disconnected from the client network 411). For example, because the network access credentials 470 no longer include the first network credentials 471 (and the client network credentials 479), the A/V recording and communication device 402 may no longer be configured for access to the client network 411 and/or the user's first network 408. In addition, because the network access credentials 470 have been updated, the A/V recording and communication device 402 may continue to transmit access requests 476, only the access requests 476 may include the third network credentials 472.

The process 2800, at block B634, may connect, by the processor using the communication module, to the third network using the updated network access credentials. For example, the processor 452 of the A/V recording and communication device 402, using the communication module 450, may connect to the user's second network 409 using the third network credentials 472 from the network access credentials 470.

Figure 29:
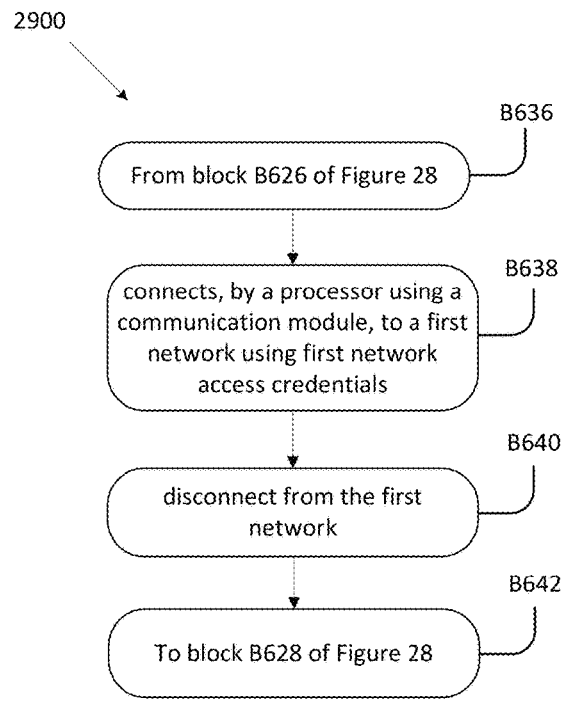

Now referring to FIG. 29, FIG. 29 is a flowchart illustrating a process for migrating A/V recording and communication devices to new networks according to various aspects of the present disclosure. The process 2900, at block B636, may continue from block B626 of FIG. 28. The process 2900, at block B638, connects, by a processor using a communication module, to a first network using first network access credentials. For example, the processor 452 of the A/V recording and communication device 402, using the communication module 450, in response to storing the first network credentials 471, may connect to the user's first network 408.

The process 2900, at block B640, may disconnect from the first network. For example, the A/V recording and communication device 402 may be disconnected from the user's first network 408. In some of the present embodiments, the A/V recording and communication device 402 may be disconnected in response to a deauthentication signal being transmitted to the access point to which the A/V recording and communication device 402 is connected (e.g., at block B614 of the process 2700 of FIG. 27). In other embodiments, the user's first network 408 may be disconnected (e.g., in response to the access point being unplugged, the network credentials being changed, etc.).

In response to being disconnected (at block B640), the A/V recording and communication device 402 may continue to try and connect to the user's first network 408 (e.g., by transmitting the access requests 476 including the first network credentials 471). At block B642, the process 2900 may continue to block B628 of the process 2800 of FIG. 28. For example, in response to the A/V recording and communication device 402 trying to reconnect to the user's first network 408 using the first network credentials 471, the A/V recording and communication device 402 may connect to the client network 411 having the client network credentials 479 identical to the first network credentials 471.

The processes of FIGS. 28-29 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIG. 30, the A/V recording and communication devices 402a, 402b may store the first network credentials 471 for accessing the user's first network 408 (at block B626 of FIG. 28). For example, during a setup/activation/reconfiguration process (such as the processes described herein), the A/V recording and communication devices 402a, 402b may receive the network access credentials 470 that include the first network credentials 471 for accessing the user's first network 408 being broadcast by the router 714a. In some of the present embodiments, as described above, the A/V recording and communication devices 402a, 402b may be individually setup/activated (e.g., such as where the A/V recording and communication devices 402a, 402b generate Wi-Fi direct networks for communicating with the client device 404 and receive the network access credentials 470 from the client device 404). In other embodiments, the A/V recording and communication devices 402a, 402b may have received the network access credentials 471 from the client device 404 according to one of the processes 2600, 2700, 2800, or 2900 described herein.

In response to storing the network access credentials 470 including the first network credentials 471 for accessing the user's first network, the A/V recording and communication devices 402a, 402b may be connected to the user's first network 408 (at block B638 of FIG. 29) at the home 704a. For example, the A/V recording and communication devices 402a, 402b may transmit the access requests 476 to the router 714a and in response be connected to the user's first network 408.

After being connected to the user's first network 408, the A/V recording and communication devices 402a, 402b may be disconnected from user's first network 408 (at block B640 of FIG. 29). For example, the router 714a broadcasting the user's first network 408 may be disconnected, the network credentials of the user's first network broadcast by the router 714*a* may be changed/updated (e.g., the first network credentials 471 may be changed to the third network credentials 472), a new router may be installed, such as the router 714*b* (e.g., after switching to a new ISP), the A/V recording and communication devices 402*a*, 402*b* may be uninstalled/taken down and moved from the home 704*a* to the home 704*c*, the A/V recording and communication devices 402*a*, 402*b* may be deauthenticated from the router 714*a*, and/or the A/V recording and communication devices 402*a*, 402*b* may be disconnected from the user's first network 408 by another method.

In response to being disconnected from the user's first network 408 (at block B640 of FIG. 29), the A/V recording and communication devices 402*a*, 402*b* may continue attempting to communicate with the router 714*a* by transmitting the access requests 476 including the first network credentials 471. As a result, the A/V recording and communication devices 402*a*, 402*b* may connect to the client network 411 (at block B268 of FIG. 28) because the client network 411 may have the client network credentials 479 identical to the first network credentials 471, as described above.

Once connected to the client network 411 being broadcast by the client device 404, the A/V recording and communication devices 402*a*, 402*b* may begin to communicate with the client device over the client network 411 (at block B630 of FIG. 28). In response to communicating with the client device 404 over the client network 411, the A/V recording and communication devices 402*a*, 402*b* may receive the third network credentials 472 from the client device 404 for accessing the user's second network 409 (at block B632 of FIG. 28). In response, the network access credentials 470 of the A/V recording and communication devices 402*a*, 402*b* may be updated to include the third network credentials 472.

In response to updating the network access credentials 470, the A/V recording and communication device 402*a*, 402*b* may be disconnected from the client network 411. As described above, the A/V recording and communication device 402 may be disconnected as a result of updating the network access credentials 470 because after the network access credentials 470 are updated, the A/V recording and communication device 402 may no longer be configured to access the client network 411. In some of the present embodiments, the A/V recording and communication device 402 may be disconnected from the client network 411 in response to the client network 411 being taken offline by the client device 404. For example, as described above, the client device 404 may exit the network reconfiguration mode 722, and as a result, the client device 404 may stop broadcasting the client network 411.

Once the A/V recording and communication devices 402*a*, 402*b* are disconnected from the client network 411 and/or have the network access credentials 470 updated to include the third network credentials 472, the A/V recording and communication devices 402*a*, 402*b* may attempt to connect to the user's second network 409 using the third network credentials 472 (e.g., by transmitting the access requests 476 including the third network credentials 472). In response, the A/V recording and communication devices 402*a*, 402*b* may be connected to the user's second network 409 (at block B634 of FIG. 28). For example, the A/V recording and communication devices 402*a*, 402*b* may connect to the router 714*b* broadcasting the user's second network 409.

In some of the present embodiments, the router 714*a* and the router 714*b* may be the same router, such as where the network credentials of the router 714*a* are changed/updated.

In such embodiments, reference to the router 714*a* may be when the router 714*a* includes the first network credentials 471 and broadcasts the user's first network 408 and reference to the router 714*b* may be when the router 714*b* includes the third network credentials 472 and broadcasts the user's second network 409.

As described herein, the processes 2600, 2700, 2800, and 2900 enable the user/owner of the A/V recording and communication device(s) 402 to update the network access credentials 470 of the A/V recording and communication device(s) 402 without having to individually access the A/V recording and communication device(s) 402. For example, if the A/V recording and communication device(s) 402 are out of reach, the processes described herein enable the user/owner to update the network access credentials 470 without having to physically interact with the A/V recording and communication device(s) 402. For another example, because the processes described herein enable the user/owner to update multiple A/V recording and communication device(s) 402 at one time, the user/owner may not have to individually update each device 402. Ultimately, because updating the network access credentials 470 of the A/V recording and communication device(s) may be made more convenient by the processes described herein, the user/owner of the A/V recording and communication device(s) 402 may be more likely to update/reconfigure the devices 402 at an earlier time (e.g., without putting off the updating/reconfiguration because the user/owner feels it may be time consuming or difficult). As a result of the A/V recording and communication device(s) 402 being updated more quickly, the home or business of the user/owner is more quickly secured and safe, thereby contributing to public safety.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 148, the button actuator 228, and/or the light pipe 232.

Figure 33:
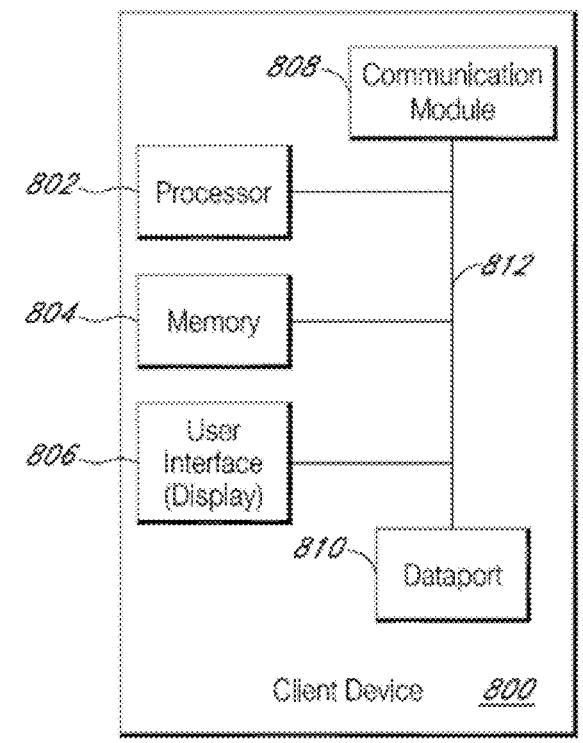
FIG. 33 is a functional block diagram of a client device on which the present embodiments may be implemented according to various aspects of the present disclosure.

FIG. 33 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 33, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE©/IPOD© 30-pin connector or LIGHTNING© connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 34:
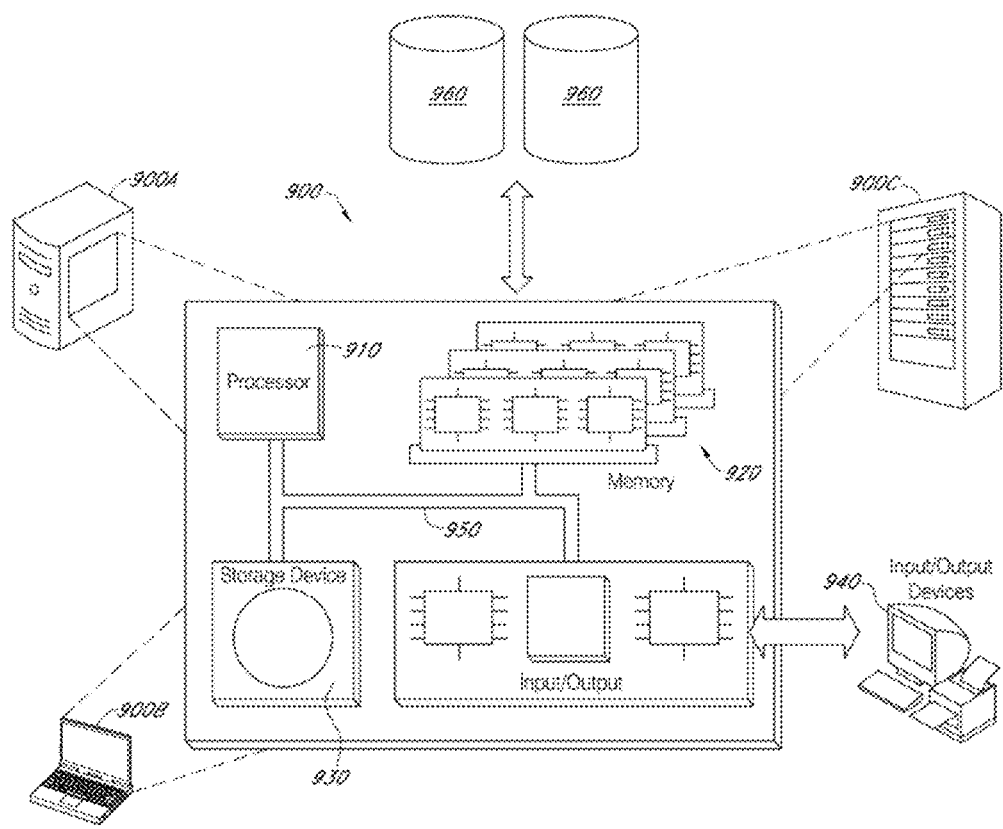
FIG. 34 is a functional block diagram of a general-purpose computing system on which the present embodiments may be implemented according to various aspects of present disclosure.

FIG. 34 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A mobile device comprising:
a communication interface;
one or more processors; and
one or more non-transitory computer-readable media storing instructions that, when executed by the one or more processors, cause the mobile device to perform operations comprising:
receiving, from a remote system, first network credentials used by an audio/video (A/V) device to connect to a first wireless network, the first network credentials comprising a first network identifier;
sending a deauthentication signal to an access point broadcasting the first network to cause the access point to disconnect the A/V device from the first network;
generating an ad hoc second wireless network different from the first wireless network, the ad hoc second wireless network using the first network identifier and the first network credentials;
receiving, from the A/V device, a request to connect to the ad hoc second wireless network using the first network credentials; and
upon establishing a connection with the A/V device over the ad hoc second wireless network, providing, to the A/V device, second network credentials for accessing a third wireless network having a second network identifier that is different than the first network identifier.

2. The mobile device of claim 1, wherein the mobile device is a smartphone.

3. The mobile device of claim 1, wherein the first network identifier comprises a first service set identifier (SSID).

4. The mobile device of claim 1, wherein the first network credentials comprise a first wireless key.

5. The mobile device of claim 1, wherein the first network identifier comprises a first media access control (MAC) address.

6. The mobile device of claim 1, wherein the second network identifier comprises a second service set identifier (SSID).

7. The mobile device of claim 1, wherein the second network credentials comprise a second wireless key.

8. The mobile device of claim 1, wherein the second network identifier comprises a second media access control (MAC) address.

9. The mobile device of claim 1, wherein the first wireless network, the second wireless network, and the third wireless network operate in accordance with an IEEE 802.11 protocol.

10. The mobile device of claim 1, wherein the sending of the deauthentication signal comprises sending a deauthentication frame in accordance with an IEEE 802.11 protocol.

11. The mobile device of claim 1, wherein the one or more non-transitory computer-readable media store instructions that, when executed by the one or more processors, cause the mobile device to perform operations comprising:
receiving, from the remote system, a first device identifier for the audio/video (A/V) device;
wherein the deauthentication signal comprises an indication of the first device identifier.

12. The mobile device of claim 1, wherein the one or more non-transitory computer-readable media store instructions that, when executed by the one or more processors, cause the mobile device to perform operations comprising:
receiving, from the remote system, a first MAC address for the audio/video (A/V) device;
wherein the deauthentication signal comprises an indication of the first MAC address.

13. A method comprising:
   determining first network credentials used by an audio/video (A/V) device to connect to a first wireless network, the first network credentials comprising a first network identifier;
   sending a deauthentication signal to an access point broadcasting the first network to cause the access point to disconnect the A/V device from the first network;
   generating, by a mobile device, an ad hoc second wireless network different from the first wireless network, the ad hoc second wireless network using the first network identifier and the first network credentials;
   receiving, at the mobile device from the A/V device, a request to connect to the ad hoc second wireless network using the first network credentials; and
   upon establishing a connection with the A/V device over the ad hoc second wireless network, providing, by the mobile device to the A/V device, second network credentials for accessing a third wireless network having a second network identifier that is different than the first network identifier.

14. The method of claim 13, wherein the mobile device is a smartphone.

15. The method of claim 13, wherein the first network identifier comprises a first service set identifier (SSID), and the second network identifier comprises a second SSID.

16. The method of claim 13, wherein the request to connect to the ad hoc second wireless network is received in response to the A/V device determining that the first network connection has been lost.

17. The method of claim 13, wherein the A/V device is caused to connect to the third wireless network using the second network identifier.

18. The method of claim 13, wherein the A/V device is caused to store the second network identifier instead of the first network identifier.

19. The method of claim 13, wherein the determining of the first network credentials is based on
   receiving, at the mobile device, user input corresponding to input of the first network credentials.

20. The method of claim 13, wherein the determining of the first network credentials is based on receiving, at the mobile device from a remote system, the first network credentials.

21. The method of claim 13, wherein the determining of the first network credentials is based on accessing the first network credentials stored at the mobile device.

22. The method of claim 13, wherein the method comprises receiving, from the remote system, a first device identifier for the audio/video (A/V) device;
   wherein the deauthentication signal comprises an indication of the first device identifier.

23. The method of claim 13, wherein the method comprises receiving, from the remote system, a first MAC address for the audio/video (A/V) device;
   wherein the deauthentication signal comprises an indication of the first MAC address.

24. The method of claim 13, wherein the method comprises receiving, at the mobile device, user input corresponding to a first device identifier for the audio/video (A/V) device;
   wherein the deauthentication signal comprises an indication of the first device identifier.

25. The method of claim 13, wherein the method comprises receiving, at the mobile device, user input corresponding to a first MAC address for the audio/video (A/V) device;
   wherein the deauthentication signal comprises an indication of the first MAC address.

* * * * *